United States Patent [19]

McCarthy

[11] Patent Number: 4,930,074
[45] Date of Patent: May 29, 1990

[54] MULTIPLE STAMP MOTION OBJECTS IN A VIDEO GAME SYSTEM

[75] Inventor: Patrick J. McCarthy, San Jose, Calif.

[73] Assignee: Atari Games Corporation, Milpitas, Calif.

[21] Appl. No.: 919,129

[22] Filed: Oct. 15, 1986

[51] Int. Cl.$^5$ .............................................. G09G 1/10
[52] U.S. Cl. ........................... 364/410; 273/DIG. 28; 364/900; 340/724; 340/799
[58] Field of Search ............... 340/724, 725, 747, 750, 340/799; 364/410, 521; 273/DIG. 28

[56] References Cited

U.S. PATENT DOCUMENTS

| | | | |
|---|---|---|---|
| 4,116,444 | 9/1978 | Mayer | 340/747 X |
| 4,119,955 | 10/1978 | Nichols | 340/750 X |
| 4,169,262 | 9/1979 | Schwartz | 340/750 X |
| 4,324,401 | 4/1982 | Stubben | 340/725 X |
| 4,445,114 | 4/1984 | Stubben | 340/749 X |
| 4,471,465 | 9/1984 | Mayer | 340/701 X |
| 4,644,495 | 2/1987 | Crane | 364/900 |
| 4,679,038 | 7/1987 | Bantz | 340/799 X |
| 4,754,966 | 7/1988 | Bottiau | 273/1 E |

Primary Examiner—Jerry Smith
Assistant Examiner—Steven G. Kibby
Attorney, Agent, or Firm—Skjerven, Morrill, MacPherson, Franklin & Friel, Ronald C. Fish

[57] ABSTRACT

There is disclosed herein a system for rapid processing of the data records of many moving and nonmoving objects on a playfield only part of which is displayed and for determining collisions between objects. A search pipeline using a synchrounous state machine searching a linked list of the records organized by approximate position on the playfield implements the search function. A lookahead cycle in the state machine is provided to continue searching for the next object which is to be visible while the graphic data from a previously found object is being loaded into a line buffer. Multiple stamp motion object graphics arrays are used to store the graphics data for each motion object. Special addressing circuitry calculates the appropriate stamp number for the portion of graphic data to retrieve and display for each motion object that is determined to be completely or partially visible in a window or displayed portion of the larger playfield.

9 Claims, 10 Drawing Sheets

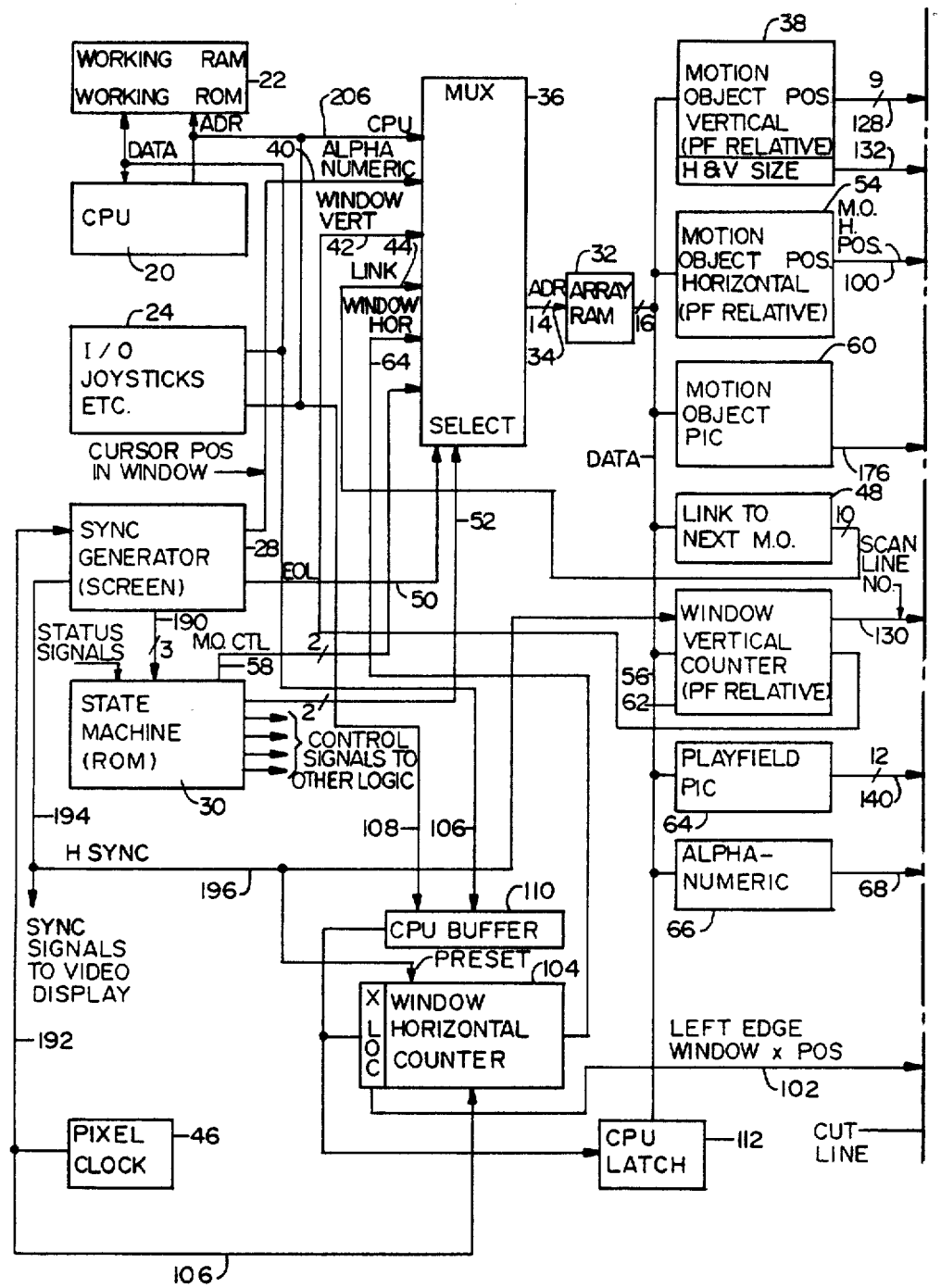
FIGURE IA

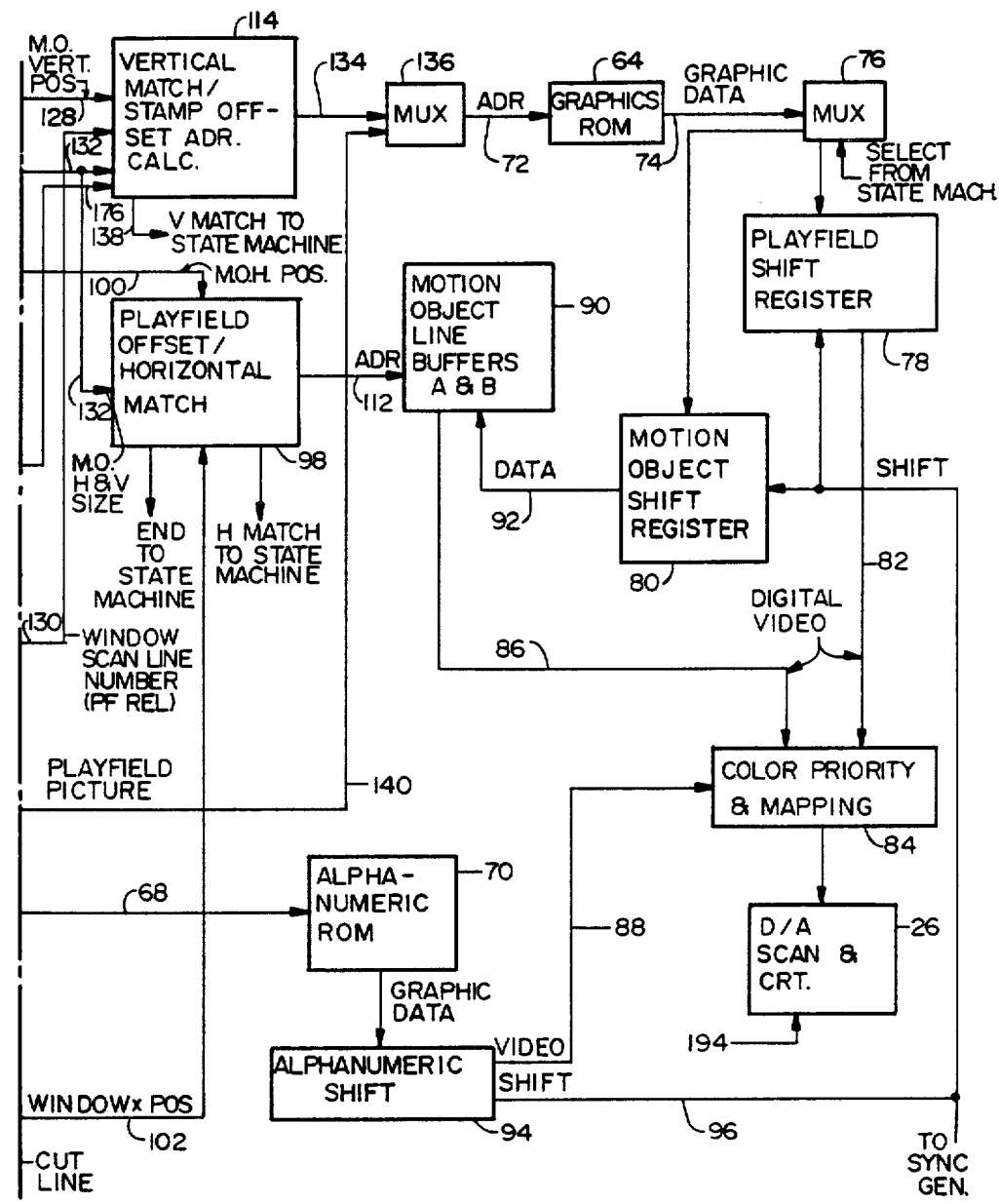
FIGURE IB

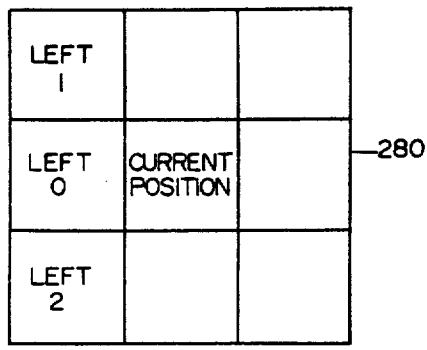

XO = X POSITION OF OBJECT LEFT 0
YO = Y POSITION OF OBJECT LEFT 0
X1 = X POSITION OF OBJECT LEFT 1
Y1 = Y POSITION OF OBJECT LEFT 1
⋮

X = X POSITION OF CURRENT POSITION OF MOTION OBJECT TO BE MOVED

Y = Y POSITION OF CURRENT POSITION OF MOTION OBJECT TO BE MOVED

TEST                    282

IF $|X-XO| \leq 16$
   AND $|Y-YO| \leq 16$ THEN THERE IS A COLLISION
ELSE IF $|X-X1| \leq 16$
   AND $|Y-Y1| \leq 16$ THEN THERE IS A COLLISION
ELSE IF $|X-X2| \leq 16$
   AND $|Y-Y2| \leq 16$ THEN THERE IS A COLLISION

FIGURE 8

MULTIPLE STAMP MOTION OBJECTS IN A VIDEO GAME SYSTEM

BACKGROUND OF THE INVENTION

The invention pertains to the field of processing of data records for objects to be displayed on a video display. More particularly, the invention pertains to the field of video game processing of a plurality of objects on a playfield to determine which objects are visible on the portion of the playfield being displayed and which objects have collided with other objects.

As video games have become more complex and sophisticated they have progressed to multiple player games with multiple characters in conflict with multiple other entitles with the battle taking place on ever more complex playfields. Because standard video display circuitry is used to display all this action, and because there are a large number of moving and nonmoving objects on such playfields there have developed severe limits on the complexity of the game than can be depicted. This is because the amount of time in which to decide which objects are to be displayed on a particular scan line and which objects have collided with other objects is limited by the amount of time the video processing circuitry takes to scan the raster lines in the image. Since this scanning is a fast process, the amount of time to process the data describing each object to make decisions about it is limited. Ultimately, this limits the number of objects that a system can handle and thereby limits the number of objects and players that the system can successfully cope with.

Accordingly, a need has arisen for a video game processing system that can rapidly handle large numbers of objects and player inputs to cause motion in desired directions of some of said objects and which can rapidly detect collisions between many such objects and many other objects on the playfield.

Further, a need has arisen for a video game system which can gracefully handle multi stamp motion objects which are larger than one stamp wide and one stamp tall. A stamp is a group of pixels and lines, generally rectangular and generally 8 pixels wide and 8 scan lines tall, which is used to provide the shape of the motion object. The pixels are written with data words which define the color or shade of gray at each location in the stamp to define the identity of the motion object by its shape. Heretofore, motion objects have been only one stamp wide. This limits the size and complexity of character shapes which could be drawn on the screen because the number of pixels available for coloring was too small to define truly complex character shapes. Thus, as the sophistication of game users has increased, there has arisen a need to be able to provide them with more colorful and complex character shapes.

SUMMARY OF THE INVENTION

According to the teachings of the invention there is provided a video system which can process a large number of moving objects under the control of multiple users and a large number of nonmoving objects within the timing constraints imposed by the video image producing circuitry. In the preferred embodiment, the video game system comprises a central CPU which runs the main game program implementing the rules of the game and which reads user control inputs indicating desired movements of the characters and which control other objects displayed on the screen. The action takes place on a playfield of which only a portion is displayed. The various moving objects and nonmoving objects which are part of the game are all placed on the playfield. The moving objects are moved in response to either user control inputs or in response to commands from the computer under the control of the main program to move the objects to create the conflict in the game. The conflict in the game is irrevelant to the invention and may be between the main characters and monsters or between the objects which the players control and other objects that the main processor controls or nonmoving obstacles. The CPU continuously evaluates the positions of the moving objects and stores data records describing both the moving and the nonmoving objects, including their positions relative to a reference point on the playfield, in a two dimensional array in a random access memory which will hereafter be referred to as the array RAM. Each location in the array maps to a certain area on the playfield. Contiguous array locations map to contiguous areas in the playfield. The nonmoving objects such as walls on the playfield are also stored in the two dimensional array as dummy motion object records which are not on the linked list but which are stored at array locations corresponding to the position where they would appear on the playfield. Hereafter, the portion of the playfield which is displayed will be referred to as the window. The dummy motion object records only contain the x and y locations of the nonmoving objects and may or may not contain a dummy picture pointer. The actual picture pointer for the nonmoving object is stored in another array in the array RAM which is accessed during a time slot devoted to painting the playfield picture (hereafter called the playfield picture array). The picture pointer is the address in read only memory where the actual graphic information defining the appearance of the object is stored. In the preferred embodiment, each array location for the motion object and dummy motion object data records (hereafter called the collision detect array) maps to a box on the playfield that is 16 pixels wide and 16 lines tall.

The moving objects in the collision detect array are linked by an ordered, linked list but this linking is not relevant to the collision detect feature of the invention. It is only an element of the invention that increases the speed of display processing which determines which of the motion objects will be visible in the window. The ordering of the list is such that the objects appear on the list in the order they would be displayed if the entire playfield was displayed in raster scan fashion from left to right and top to bottom. In embodiments where raster scanning is not used, the linked list need not be ordered in this fashion. When the moving objects move, the linked list is reordered by the computer during its time slot for access to the array RAM to maintain the proper order in the linked list.

The video game system processes the data records in the array RAM in time multiplexed fashion. A time slot will be given to the CPU to read records from or write records to the array RAM. During this time slot the CPU does any of the following things: it builds the array databases (there is a collision detect array, a playfield picture array, an alphanumeric array and a slip table or array), it moves objects per user commands by changing the position offset field in the record to reflect the object's new position relative to a playfield reference point (usually the upper left corner of the playfield), it updates the array entries to change the links on the linked list and change the slip table entries or to move object records to the proper locations in the collision detect array when the objects have moved, or it reads data records of objects that have been moved and neighboring objects for collision detect processing. The term "slip" as used herein, means a starting link pointer or link to the correct object data record on the linked list where processing for any particular raster scan line is to start.

Another time slot is devoted to access of nonmoving objects for purposes of displaying the walls and or other nonmoving objects which form part of the playfield landscape. Another time slot is devoted to access of the aplhanumeric data for display of information on the screen regarding the score or other textual material.

Another time slot is dedicated to linked access to the next motion object on the linked list either through use of the link from the last object processed or by use of a slip. The slip table lists the places on the linked list where "hit" processing should start on each raster scan line to determine which motion objects are in positions to appear on the scan line. The slip table is updated by the CPU during its time slot whenever the order of the linked list is changed. Access into the slip table is generated by decoding data including the current scan line number being processed in the current window. The slip data is accessed from the slip table in the array RAM and latched into a link register at the begining of the scan of each new raster scan line.

The last described time slot is devoted to accessing data records from the linked list describing the y positions for the motion objects. This data is used to do y hit processing to determine if there is a possibility that the object will appear on the current scan line. If a y hit is found, the pointer to the graphic data for the motion object is retrieved and the x position of the object is examined to determine if there is an x hit, i.e., the object is located along the visible portion of the x axis on the playfield which is currently being displayed. Each data record has x and y coordinate data describing the position of the motion object relative to a reference point on the playfield. Each data record also has a link field containing a pointer to the next record on the linked list. To avoid needless processing of data records for objects that will not be visible, access to the data records at the correct point in the linked list is gained by using the slip pointing to the first motion object on each scan line, and, thereafter until the end of the line, by using the links to continue processing. At the end of each line, a signal is generated by a state machine/sync generator controller logic to cause the slip address to be updated to its new value and to be latched into the link register for use in access to the linked list at the proper point for processing the next line.

Every time a motion object is to be moved, a collision detect process must be performed to determine if the movement would result in a collision with either another motion object or a nonmoving object on the playfield. The CPU performs this process in a rapid manner by comparing the position of the object to be moved to the positions of only and at most the nearest objects in the path of movement since the motion object obviously will not have collided with any objects not in the path of movement. To do this the CPU uses a two dimensional collision detect array of data records describing the relative positions of the moving and nonmoving objects on the playfield and accesses the records of only the closest objects in a specific pattern that lies in the path of movement and which will intersect said path of movement. The position data in the data records so accessed are then compared record by record to the position data of the object to be moved.

Both the x and y coordinates of all the objects in the array are expressed in offsets from the reference point on the playfield so that the comparison process does not have to wait for the whole array to be rewritten every time the window changes position.

The comparison is done by substracting the x position of the first record in the pattern from the proposed new x position of the object to be moved and testing the absolute value of the result to determine if the result is smaller than a specific, constant number. If the result is not smaller than the specific constant, then the y position comparison is skipped, and the next record in the pattern is retrieved and the comparison is started on the new record. If the result of the x comparison for the first record is smaller than the constant, the y positions are compared in the same manner. If the absolute value of the result is smaller than the constant, a collision has occurred and all further record comparisions are stopped since the moved object need only collide with one thing to trigger collision processing. If the absolute value of the result is not smaller than the constant, the next record for an object in the pattern is retrieved and the position comparison process continues.

Once a collision has occurred, the CPU determines which motion object has collided with which other object and the proper course of action take for that type of collision. For example, if a laser blast motion object has collided with an attacking monster, the proper course of action may be to make the monster disappear. If a monster motion object has collided with the character being manipulated by a player, the proper course of action may be to make the character die or lose health, power etc. If the collision was between a character and a wall on the playfield, the proper course of action may be to make the character's motion in the direction of the wall stop at the wall. The proper course of action may differ in different embodiments to implement different rules of play.

According to the teachings of the invention, multi stamp motion objects are provided. Motion objects may consist of an array of stamps up to 8 stamps wide and 8 stamps tall. Each motion object record on the linked list consists of four words, one of which is the address of the first stamp in the array of stamps. The other words or the motion object's data record contain the motion object's vertical and horizontal size, the horizontal and vertical positions and the link to the next motion object. During each scan line, a chain of motion object data records are examined by logic that compares the y position of the motion objects to the y position of the current scan line, both positions being expressed in playfield relative terms. The comparison circuitry delivers a number which is the row number for the stamp in the motion object array containing the current scan line. The row number of the stamp and the horizontal size information is used to look up or calculate a motion object stamp offset number. This is the stamp number of the first stamp in the array on the row containing the current scan line. Each array of stamps is numbered with the stamps in row 1 numbered 1, 2, 3 .. up to 8. The first stamp in the second row will then be numbered as the next number in the sequence following the number for the last stamp in row 1. A counter then counts as each stamp is processed to provide the relative address of succeeding stamps in the current row. The motion object picture field also contains a field which is the actual address in the graphics ROM of the first stamp in the array. This address is added to the offset from the first stamp number of the current stamp number.

The comparison circuitry also delivers a number which represents the actual scan line in the current stamp which is being scanned. This information plus the actual address of the current stamp in ROM derived from the above described circuitry is used as an address to access a ROM where the graphic data in the form of a pixel pattern for that type of motion object is stored. The correct pixel pattern is then latched into a shift register and shifted bit by bit into the line buffer being loaded in preparation for scanning the next line. All the foregoing process is done one line time ahead of the time of actual scanning of the line and is stored in one of a pair of "ping pong" line buffers in waiting for the actual scanning process. The other ping pong buffer stores the pixel pattern that is actually being scanned at any particular moment According to another aspect of the teaching of the invention there is provided a lookahead feature for processing the linked list of motion objects to determine which will be visible in the current window. In the preferred embodiment of the invention, a synchronous state machine in the form of a ROM coupled to a sync generator and to several status signals is used to generate the control signals which control the time slots for multiplexing of addresses for the array RAM and the latching of output data from the array RAM. The status signals which are input to the state machine indicate the match or no match condition for the vertical and horizontal position comparisons between the current motion object's position and the scan line being painted in the current window. These status input signals to the state machine also indicate several other things: when the end of processing of all the stamps on one row of a motion object has occurred; when the end of each scan line is reached; and, when the state machine is entering its first cycle of 7 basic time slots which are used in looking for hits and doing other things. The state machine has a foreground cycle of 7 time slots where various addresses are selected and various data is written to or read from the RAM.

The foreground cycle is generally for the purpose of processing the linked list records to determine which motion objects at or beyond the slip pointer address are to be displayed on the current line. Each motion object is processed first for a y hit. This means that for an object which is a "hit", i.e., will be visible, the y position is such that part of the object is supposed to appear on the current scan line. If there is a y hit, the motion object is processed for an x hit in another time slot of the foreground state machine cycle. This x hit processing is to determine if the x position of the object and the x position of the window and the horizontal size of the object are such that the object is supposed to at least partially appear on the current scan line.

Since the process of processing a multistamp motion object to retrieve the graphic data for several stamps on the current line takes some time to complete, the state machine also has a background cycle. This cycle is entered each time a status signal indicating that the stamps of a previous motion object are still being processed to load the graphic data into the line buffer. The purpose of the background cycle is to continue processing of the next motion objects on the linked list following the motion object last processed in the foreground states. The background processing however is limited to determination of which motion object on the linked list has both a y hit and an x hit. No picture pointer is retrieved for any motion object having a y hit and an x hit found in the background state. Only the foreground states retrieve picture data.

To perform its function, the background cycle continues processing the motion objects further down the list from the motion object which is currently having its graphic data loaded into the line buffer so as to implement a lookahead function. When the background states find the next motion object with both an x and a y hit (in some cases, one foreground state is also involved in the lookahead function), processing goes into a hold mode where the background states continue to cycle in looking at the horizontal position of the motion object which was found, but no new motion objects are processed. This holding continues until the foreground states and the associated circuitry finish loading all the picture data from the original motion object into the line buffer as signaled by one of the status signals. The foreground cycle is then re-entered, and the picture pointer is retrieved for the object so located in the background states. This pointer is used to access the graphic data from the graphics ROM for the new motion object. If this motion object is more than one stamp wide then, as soon as this graphic data loading process commences, the status signal indicating that the graphics ROM and shift registers are busy with the graphic data loading process is, and the background cycle is re-entered to continue the lookahead process. A motion object which is only one stamp wide can be processed and loaded to the line buffer in one complete foreground cycle of 8 time slots, at the rate of one time slot per pixel. The background cycle is entered only if the motion object to be displayed has more than one stamp horizontally which will be visible.

BRIEF DESCRIPTION OF THE DRAWINGS

FIGS. 1A and 1B are a block diagram of the circuitry implementing the teachings of the invention.

FIG. 8 is a symbolic diagram of the conventions and tests used to determine the presence of collisions between objects on the playfield.

DETAILED DESCRIPTION OF THE PREFERRED EMBODIMENT

Figure 2:
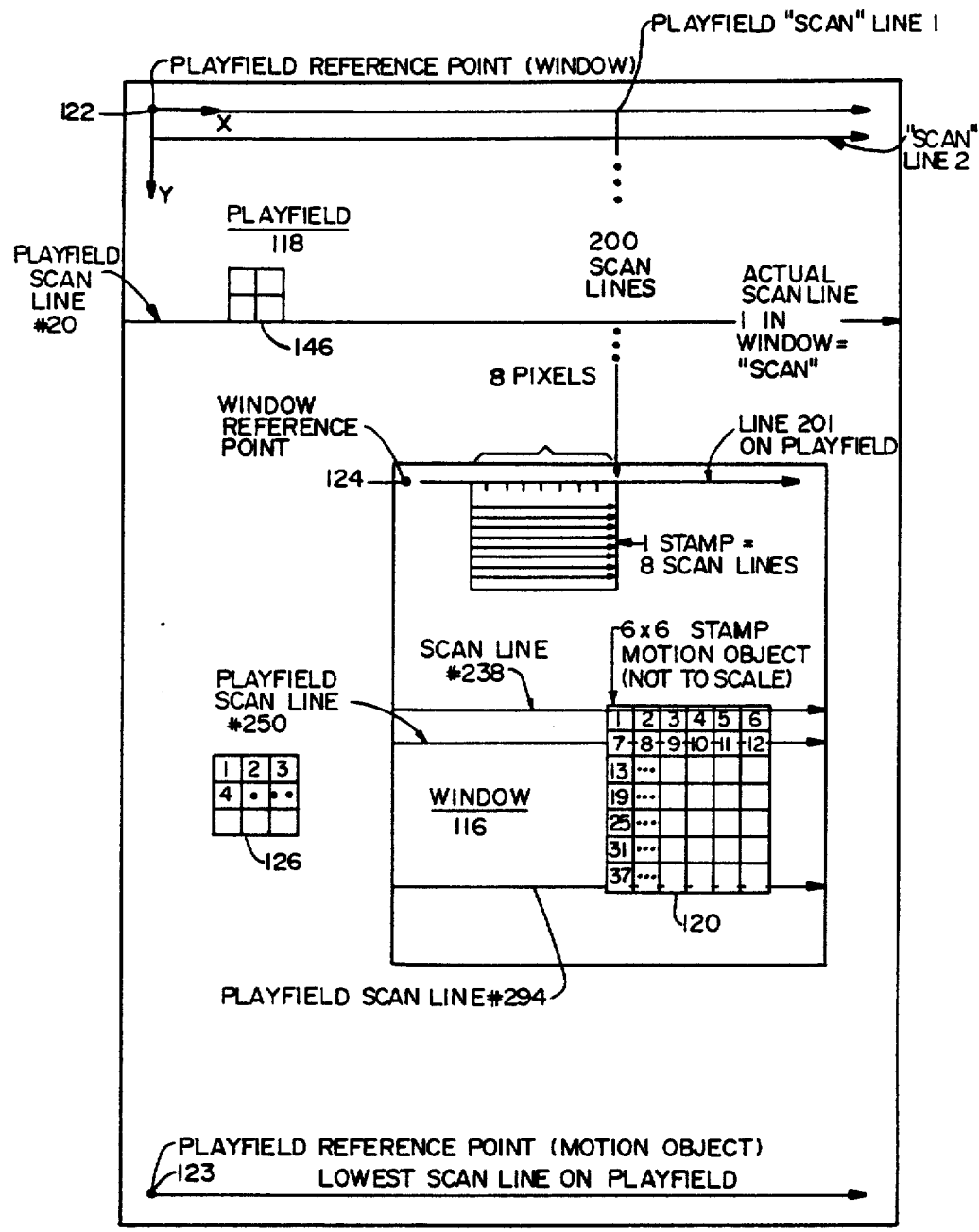
FIG. 2 is an illustration of the conventions used in describing the positions on the playfield of motion objects and playfield objects, the current window position and the stamp arrays of the objects on the playfield.

Referring to FIGS. 1A and 1B, there is shown a block diagram of a system according to the teachings of the invention. For convenience, the reader may wish to cut both FIGS. 1A and 1B along the cut line and assemble them as one figure. These two figures will be hereafter referred to as FIG. 1. Such a system has utility in a video game or other application where large numbers of moving objects must be displayed on a screen and/or where collisions among them during the movements must be detected.

A computer 20 runs a main program stored in working ROM 22 to do various functions for the system. The main program implements the particular rules of the game, and causes the computer 20 to perform input/output operations to read user control input data from user controls and interface unit 24 and is given in Appendix A. The user control interface unit is of known design and is not critical to the invention. It provides one or more user control sets such as joysticks, fire buttons, magic buttons etc. In the preferred embodiment, four user control sets are provided, and the computer 20 reads data from them either by interrupt vector processing or by polling of the controls. In the preferred embodiment, polling is used. The particular rules of the game implemented by the main program such as what happens when a monster collides with a character or what happens when a character's shot or other form of assault collides with a monster are not critical to the invention. The teachings of the invention are broadly applicable across the video game market and, in fact, may be useful in other fields such as processing radar or sonar images with large numbers of moving targets where collision or proximity must be detected.

In the preferred embodiment, the system of FIG. 1 is used in a video game involving four main characters which move and fight against multiple moving monsters. Some of the characters shoot rays or bullets and these also are displayed as moving objects. All this action takes place on a playfield which is essentially a maze with walls, treasures, food, keys and other stationary and nonstationary objects placed therein. All of these moving and nonmoving objects have data records stored in a database comprised of several arrays in the array RAM. Each of the records in the database describes certain attributes of the object. Among these attributes for each object are the horizontal and vertical position on the playfield.

In the preferred embodiment, the playfield has multiple levels each of which are different. The information as to the configuration of each level and the locations of the various nonmoving objects on each level is stored in a working ROM shown as part of memory 22. The computer uses data from this ROM to build a two dimensional playfield array in the array RAM 32. Each nonmoving object record in the playfield array also has a dummy motion object entry in the collision detect two dimensional array in the proper array location that corresponds to the position of the object on the playfield. This dummy entry has the x position and y position data of the object and may or may not have a picture pointer. The presence or absence of the picture pointer is irrelevant to the invention. The purpose of this dummy entry is to complete the collision detect array with all the moving and nonmoving objects on the playfield so that collision detect processing can be done from one array. The nonmoving objects in the collision detect array may or may not be part of the linked list.

In the preferred embodiment, only a portion of the playfield is displayed. This portion of the playfield will be hereafter called the window. The playfield has a reference point which can be anywhere but which is usually its upper left corner. The window also has a reference point, and it also can be located anywhere in the window but is usually located in the upper left corner. There may be as many as 1024 moving and nonmoving objects scattered about the playfield at any particular time, but only some of them will be visible in the window. The positions of the moving and nonmoving objects are expressed in terms of their offsets from the reference point on the playfield. In the preferred embodiment, the window location is moved to keep the four main characters visible at all times. In other embodiments, the window may remain stationary or may follow the movements of some but not all the main characters. A major function of the system of FIG. 1 is to determine which of the moving and nonmoving objects on the playfield will be visible in the window. The system is aided in this process by the fact that the positions of all the objects on the playfield are expressed as playfield relative offsets.

The computer 20 is responsible for creating the database for all the objects and updating the database when the position of the objects change. As the term is used herein, the database is comprised of several arrays and tables. There is a collision detect two dimensional array, a playfield two dimensional array, an alphanumeric two dimensional array and a slip table in an otherwise unused part of the alphanumeric array. The database also contains data regarding the current score for each player and the current position of the window. All these array entries and other data are updated by the computer. For example, the computer is responsible for calculating the new position of the window and for updating the data records which indicate where the window is currently located. Also, the computer updates the data records regarding the current score. The computer is also responsible for determining when collisions between objects in the database occur when one or all objects involved in the collision move too close to the other object or objects.

Because the display is to be on a video color monitor, the speed at which each scan line is traced by the electron beam sets the basic time limit during which all processing of objects to determine which are to appear on the particular scan line must be completed. Since each scan line is traced in a very short time, there is a need to process the objects in the database with great efficiency to be able to finish processing them in sufficient time.

Because of the limited time available for processing objects, both the moving and the nonmoving objects are stored in the RAM 32 as part of the two dimensional collision detect array where each location is physically mapped to a corresponding area on the display. This data organization allows the collision determinations made by the computer 20 to be made in a more expeditious manner by only checking the nearest objects in the direction of movement.

To speed up processing to determine which objects are to be visible in the window, the moving objects in the database are organized as a linked list. The link organization is set by the computer 20 to approximate the order in which the objects would appear if the entire playfield were displayed in raster scan fashion. When the objects move, the computer 20 changes the links on the list to adjust the order of the list to again correspond to the physical order of appearance of the objects. To maintain the physical order of appearance of the objects. To maintain the physical mapping that is necessary for the collision processing, the data record of the objects which have moved must also be moved to the addresses in the RAM which correspond to the array location which maps to the object's current location in the window on the playfield..

The known synchronization signals needed by the video display 26 are generated by a sync generator 28 which is driven by a pixel clock 46. These sync signals also serve as a basis to generate basic timing signals used to clock the system. Some of these clocking signals are coupled to a state machine 30 and are used in conjunction with other status signals as address signals for a ROM which implements the state machine. The state machine serves to generate the control signals which control the other circuitry in the system for address selection and latching of data coming out of the RAM. The truth table of the state machine 30 is given in Appendix B, not reprinted here. Appendix B can be found only in the patented file.

The database of records for the moving and nonmoving objects is stored in an array RAM 32. The address inputs 34 to this RAM 32 are controlled by a multiplexer 36. The multiplexer has one output coupled to the address input port of the RAM 32 and several inputs coupled to various sources for addresses. The state machine generates the select signals to cause the multiplexer to select one of the several inputs for connection to the output bus 34 during each of the 7 basic time slots in the time division multiplexing of the system.

The seven basic time slots established by the state machine will be explained in greater detail later when the state diagrams of the state machine 30 are explained. Basically, the time slots so that one time slot allows the computer 20 to access the database RAM to build or revise the database. Another time slot allows alphanumeric information to be displayed on the screen at specified locations such as the score of each player and other information about the game. Another time slot allows the link address to the next motion object to be loaded to enable continued "hit" processing to determine if the next object on the linked list is to be visible. Another time slot allows the vertical position of the current motion object to be examined for a "y hit". Another time slot allows a slip pointer address to be loaded which points to the correct position on the linked list to begin processing for the current window position to determine which objects will be visible.

Because the data which emerges from the RAM during each of the time slots is transitory, a series of latches are provided to store the data temporarily. A latch 38 stores the vertical position data of the motion object record which has currently been retrieved from the RAM 32. This motion object is retrieved when the state machine either causes the slip address to be selected or the link address to be selected by the multiplexer 36. The slip address is comprised of a few bits from the alphanumeric address input on line 40 concatenated with the window vertical address on line 42. The link address is the address on the line 44.

The slip is used to save time in processing the motion objects on the linked list to determine which will be visible at the current window location. Because the linked list includes all the motion objects on the entire playfield but the window only displays a fraction of the total playfield, the slip is used to vector the y hit processing to the proper point on the linked list to start processing. This prevents y hit processing of data records for objects which are so far outside the window that there is no possibility that they will be visible in the window. There is a slip for every 8 scan lines in the preferred embodiment. Each slip points to the first motion object on the linked list that would appear on each group of eight scan lines.

There are 64 slips in the preferred embodiment, and they are stored in an otherwise unused portion of the alphanumeric two dimensional array in the array RAM 32. The proper slip in the slip table is accessed by selecting the window vertical address on line 42 with the proper bits of the alphanumeric address on line 40 and applying them to the address bus 34. The slip then appears and is latched into the link to next motion object latch 48. This process occurs once per scan line. It is caused when the select signals on lines 50 and 52 assume states which indicate that the beginning of a new scan line is at hand, as signaled by the signal on the line 50, and when the signals on line 52 indicate that the state machine is ready to get the link to the next motion object.

A latch 54 is used to store the motion object horizontal position data when the state machine 30 causes same to be accessed. Each motion object record is comprised of 4 words. These words cannot all be placed on the data bus 56 at the same time, and the link address on line 44 is the index into the motion object record. When the data desired by the state machine resides in one of the other words, the state machine changes the bit pattern on the motion object control bus 58 (M.O. CTL) to select the desired word. The state machine is also coupled to the clock or load inputs of all the latches so that the proper one of them can be enabled to load the data then present on the data bus 56. These are the structures that allow the state machine to access the horizontal position data for the motion object pointed to by the link address (or slip) to appear on the data bus 56 and to store it in the latch 54.

The part of the motion object record which comprises the address in ROM of the graphic data or actual pixel pattern for the motion object is stored in the latch 60.

The position on the playfield of the particular scan line being processed is tracked and stored in the window vertical counter 62. This counter is loaded with the playfiled relative scan line number of the top of the window from a particular storage location in RAM which is kept updated with the current vertical location by the computer 20. This scan line number is loaded into the counter 62 at the beginning of every frame by a signal (not shown) from the sync generator or the state machine. The counter 62 counts up from this scan line number each time the HSYNC signal from the sync generator 28 occurs. The actual signal used to cause the counting by the counter 62 is not the horizontal synchronization signal that causes the flyback after every line is painted on the display but is a digital signal derived therefrom.

The address of the playfield stamp in the graphics ROM for the current electron beam position in the window is accessed by the state machine by causing the multiplexer 36 to select the address window vertical on line 42 and window horizontal on line 64. The address bits on these two lines define the current electron beam position on the playfield in terms of an offset from the reference point on the playfield. When this address is selected, the playfield picture stamp address is output from the array RAM 32 and is latched into the playfield picture latch 64. The playfield picture addresses are stored in a two dimensional array in the array RAM 32 which is organized so the array locations map to corresponding areas on the display.

The graphics data for the playfield stamps and the motion object stamps is stored in the graphics ROM 64. When the address of a motion object or playfield stamp is presented as an input on a bus 72, the graphics ROM delivers the graphics data on the graphics data output bus 74. This graphics data is routed through a multiplexer 76 under the control of the state machine. The data is routed to either the playfield shift register 78 or the motion object shift register 80 depending upon what type of graphics data is being output. The shift registers shift the graphics data out serially for use in painting the particular scan line being processed. In the case of the playfield shift register 78, the data is shifted out on line 82 as digital video information to a color priority and mapping circuit 84. This circuit receives as inputs, digital, serial information on the lines 82, 86 and 88. The data on the line 86 comes from either line buffer A or line buffer B in the line buffer circuit 90. The digital data on the line 86 is motion object data which was shifted into the line buffer 90 by the motion object shift register 80 via a line 92. This occurs for line buffer B while line buffer A is being displayed and occurs for line buffer A when line buffer B is being displayed. The data on line 86 is the motion object data for the line currently being displayed. The digital data on line 82 is the playfield data. The shifting is done under the control of a SHIFT signal from the sync generator 28 so as to be synchronous with movement of the electron beam across the scan lines. The digital video data on line 88 carries the pixel patterns for the alphanumeric information that is to be displayed.

In the priority and mapping circuit 84, the incoming serial, digital, video data is prioritized and a decision is made as to which information will be displayed for each particular playfield location that is visible in the window. There may, for any one playfield location, be several items that must be displayed. For example, alphanumeric information, a motion object and playfield wall may all be independently shifted into the circuit 84 for display at the location. Not all these items may be displayed there, so the circuit 84 decides which item to display and sends the proper digital video information to the digital to analog conversion, scan and display circuitry 26. The circuit 84 also adds color information to the data stream based upon the color palette information in the data records for the playfield and motion object data records. The palette data is stored in a portion of one of the words of both the motion object and the playfield data records. The design of the color priority and mapping circuit is game dependent, not critical to the invention and conventional and will not be detailed herein.

The alphanumeric information to be displayed on the screen is stored in an alphanumeric array in the array RAM 32. This information is kept current by the computer 20, and is accessed by selection of the alphanumeric address on line 40. The alphanumeric address is expressed in window relative terms as an offset of the current electron beam position from a reference point in the window, usually the upper left hand corner. When this address is selected, the address of the alphanumeric graphic information for that particular window position is accessed from the array RAM 32 and latched in the alphanumeric latch 66. This address is output on the line 68 to the alphanumeric ROM 70 where the actual graphic data is stored. This causes the actual pixel pattern for the particular alphanumeric stamp accessed to be loaded in parallel format into an alphanumeric shift register 94 and to be shifted out on line 88 synchronously with movement of the electron beam across the screen.

The addresses supplied for shifting of serial, motion object video data into the line buffers 90 are supplied by a playfield offset horizontal match circuit 98. This circuit has as its input the motion object horizontal position data on the bus 100 and the x position of the edge of the window on bus 102. The information on the bus 102 is supplied by a window horizontal counter/latch 104. The circuit 104 serves to store the current x position of the edge of the window in a latch and to count up pixel positions from the edge of the window upon receipt of pixel clock signals on line 106. The current x position of the edge of the window is stored in the latch portion of the circuit 104 by the computer 20 via the data bus 106 and the address bus 108 of the computer. Data is loaded into the x location latch of the circuit 104 through CPU buffer 110 enabled by the computer address bus. The window horizontal counter 104 presets to this x location, expressed in playfield relative terms, at the end of each scan line. Any suitable circuitry to implement this preset function may be used, e.g., a preset signal based upon HSYNC or upon reaching a predetermined count indicating the end of the scan line has been reached.

The playfield offset horizontal match circuit 98 also receives data regarding the horizontal size of the motion object. From the horizontal position data, the circuit 104 generates a horizontal match or x hit signal called HMATCH on line 99 which is sent to the state machine. The horizontal match circuit 98 also uses the horizontal size data and the horizontal position data and generates an END signal on line 101. This signal is transmitted to the state machine 30 to indicate when the last horizontal stamp graphic data in a motion object's array of stamps on a particular scan line is being shifted into the line buffers 90. This END signal indicates to the state machine that it is permissible to re-enter the foreground state from the background state. The END signal also means that it is permissible to continue to access and process data records for other motion objects on the linked list and to use the graphics ROM 64 for loading the pixel data into the line buffer since the graphics ROM is no longer tied up in accessing graphic data for the previous motion object. The horizontal position data of the edge of the window and the motion object are also used to generate the window relative positions of the motion objects to be shown on the current scan line being stored in the line buffers 90. This window relative position is sent on the address bus 112 to the line buffer to control loading thereof. The details of this horizontal match circuit 98 will be described in more detail below.

When the computer 20 wishes to update any information in the array RAM 32, the data bus 106, address bus 108, buffer 110 and a CPU latch 112 are used to store the data to be written into the RAM. The latch 112 is loaded for input and enabled for output of the stored data onto the data bus 56 by control signals from the state machine (not shown) during time slots devoted to CPU access to the array RAM 32.

A vertical match and stamp offset address calculation circuit 114 serves to process the motion object vertical position and size data with data regarding the vertical position of the current playfield scan line to determine whether a particular motion object is to be displayed. This circuit 114 also calculates the stamp number of the first stamp in the motion object's array of stamps in which the current scan line lies. Reference to FIG. 2 will clarify this last statement. FIG. 2 (not to scale) shows a typical position of the display window 116 in a playfield 118 and shows the typical size for one stamp of video graphic data and shows a typical 6×6 stamp motion object 120 (the maximum size for a motion object in the preferred embodiment is an 8×8 array of stamps). Motion objects have their x and y locations expressed in terms of the playfield relative position of the first stamp in the lowest (most positive y coordinate) row of stamps in the motion object's array of stamps relative to a reference point 122 at the upper left corner of the playfield. In the case of the motion object 120, the position of stamp 37 is stored in the array RAM as the number of scan lines down the y axis from the playfield reference point 122 and the number of pixels to the right along the x axis from the playfield reference point 122. The playfield dimension along the y axis can be expressed in the number of scan lines or in some other unit which can be converted to scan lines. The playfield scan lines such as lines 1 and 2 at the top of the playfield are not video display scan lines but are, instead, fictional playfield scan lines since all areas outside the window 116 will not be visible. The scan lines that are within the boundaries of the window 116 will be visible however.

Each scan line in the window can be identified by either its playfield relative position or by its screen relative position. For purpose of discussion, the terms "screen relative" and "window relative" are interchangeable. In the preferred embodiment, the current scan line's y position is expressed in terms of the number of scan lines down from the reference point 122. For purposes of the access to the alphanumeric information however, the current scan line is expressed in terms of the number of scan lines down from the window position reference point 124 where the current scan line lies.

Figure 3:
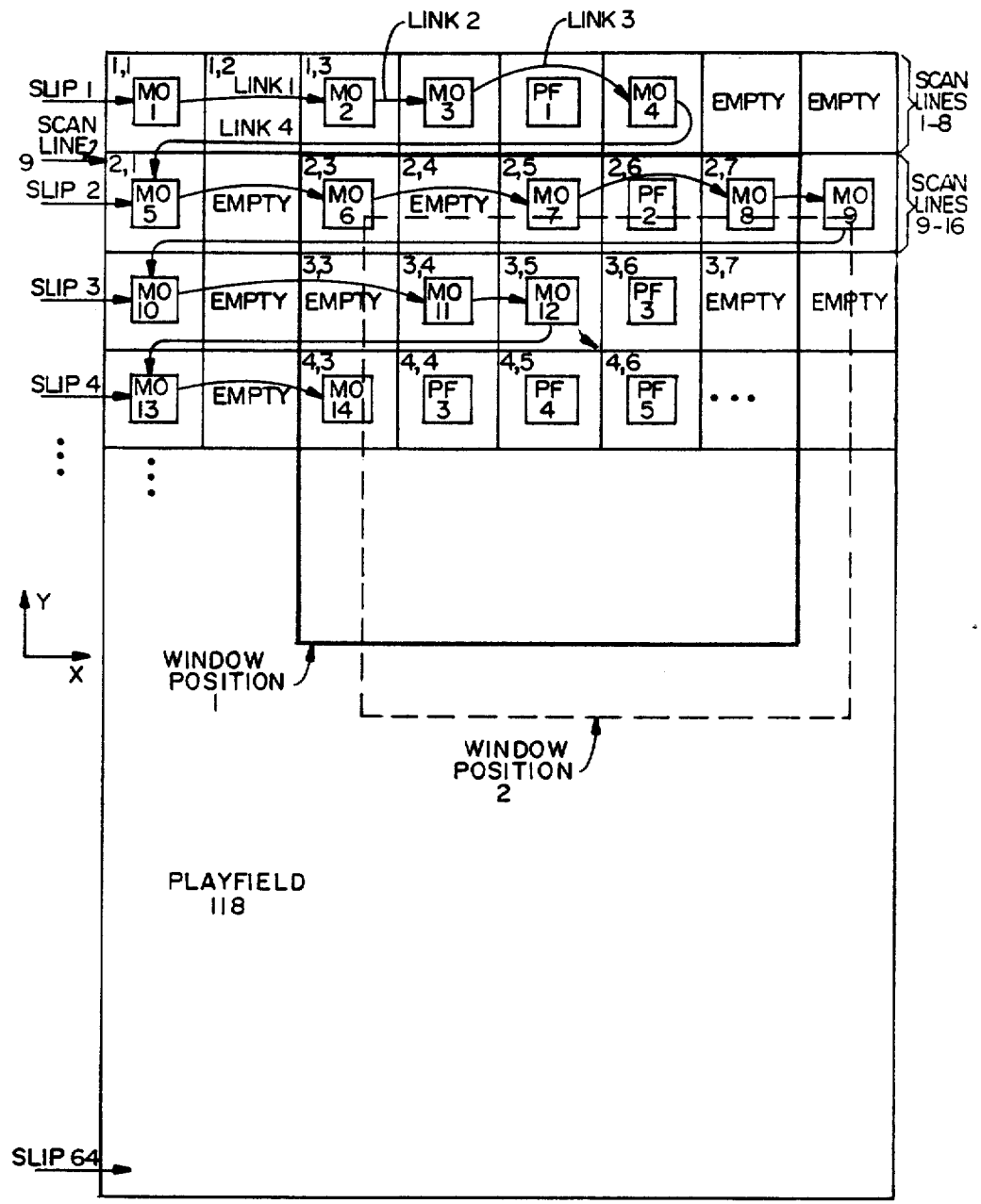
FIG. 3 is an illustration of the collision detect array in the array RAM.

Referring again to FIG. 1, the purpose of the vertical match circuit 114 is to compare the y position of all the motion objects on the linked list starting from the motion object at the slip address to the y position of the scan line currently being processed to determine if any part of the motion object will appear on that scan line. FIG. 3 is a diagram of the mapping of the locations in the two dimensional collision detect array in the array RAM 32 to the corresponding locations on the playfield 118. Two different positions for the window are shown. The array locations in the collision detect array are shown as the boxes with x and y collision detect array coordinates in the upper left corners. The motion objects on the linked list are shown as boxes with numbers in them giving their position on the list. Links between the motions objects are shown as arrows connecting the boxes. Playfield objects i.e. non-moving objects, such as walls are shown as boxes with designations such as PF 1 in them.

Since only the motion objects which are inside or partially inside the window positions will be visible, the job of circuit 114 is to determine which ones of the motion objects have y positions which are within the y extents of the current window location. This process is speeded up by the fact that the circuit 114 only has to examine the y positions of the motion objects on the linked list starting with the motion object pointed to by the current slip. The function of the slips is illustrated in FIG. 3. For processing the linked list for the window position 1, the state machine 30 would force slip 3 to be latched into the link register 48 at the beginning of scan line 9. Thus only the data records for motion objects 5 and following would be presented sequentially to circuit 114 for y hit processing.

This y hit processing is done by comparing the motion object y position (expressed playfield relative) on bus 128 from latch 38 to the current window scan line being processed (expressed playfield relative on bus 130 from latch 62. When a y hit is found, the signal VMATCH on line 138 coupled to the status signal inputs of the state machine 30 is caused to go true.

The circuit 114 also calculates which stamp number in the array of stamps making up the motion object to address given the scan line that is currently being processed. To determine this, the circuit 114 compares the current scan line number to the motion object's vertical position and the motion object's horizontal and vertical size. Referring again to FIG. 2, if the current scan line was line 250, the circuit 114 would process motion object 120 and find a y hit because the y position of stamp 37 is within the y extents of window 116. After finding the y hit, the horizontal size data on bus 132 from latch 38 of 6 stamps would be used to calculate that the first stamp number of motion object 120 would be stamp number 7 for that type of motion object. The address of stamp 7 would then be calculated and provided on the address bus 134 through a multiplexer 136 controlled by the state machine to the address input but 72 thereby causing access of the proper graphic data. In another embodiment, instead of using a multiplexer 136, the output of the circuits 114 and 98 may be tri-state outputs coupled to the same bus with the state machine controlling the tri-state control signal so that only one or the other of these circuits in non-tri-state thereby implementing a de facto multiplexer.

The other input to the multiplexer 136 is the address of the playfield object picture field stored in latch 64 and coupled on bus 140 to the input of the multiplexer. The multiplexer 136 is controlled by the state machine 30 to couple the proper address at the proper time to the graphics ROM 64 to be able to access both playfield and motion object graphic data out of the same ROM.

Figure 4A:
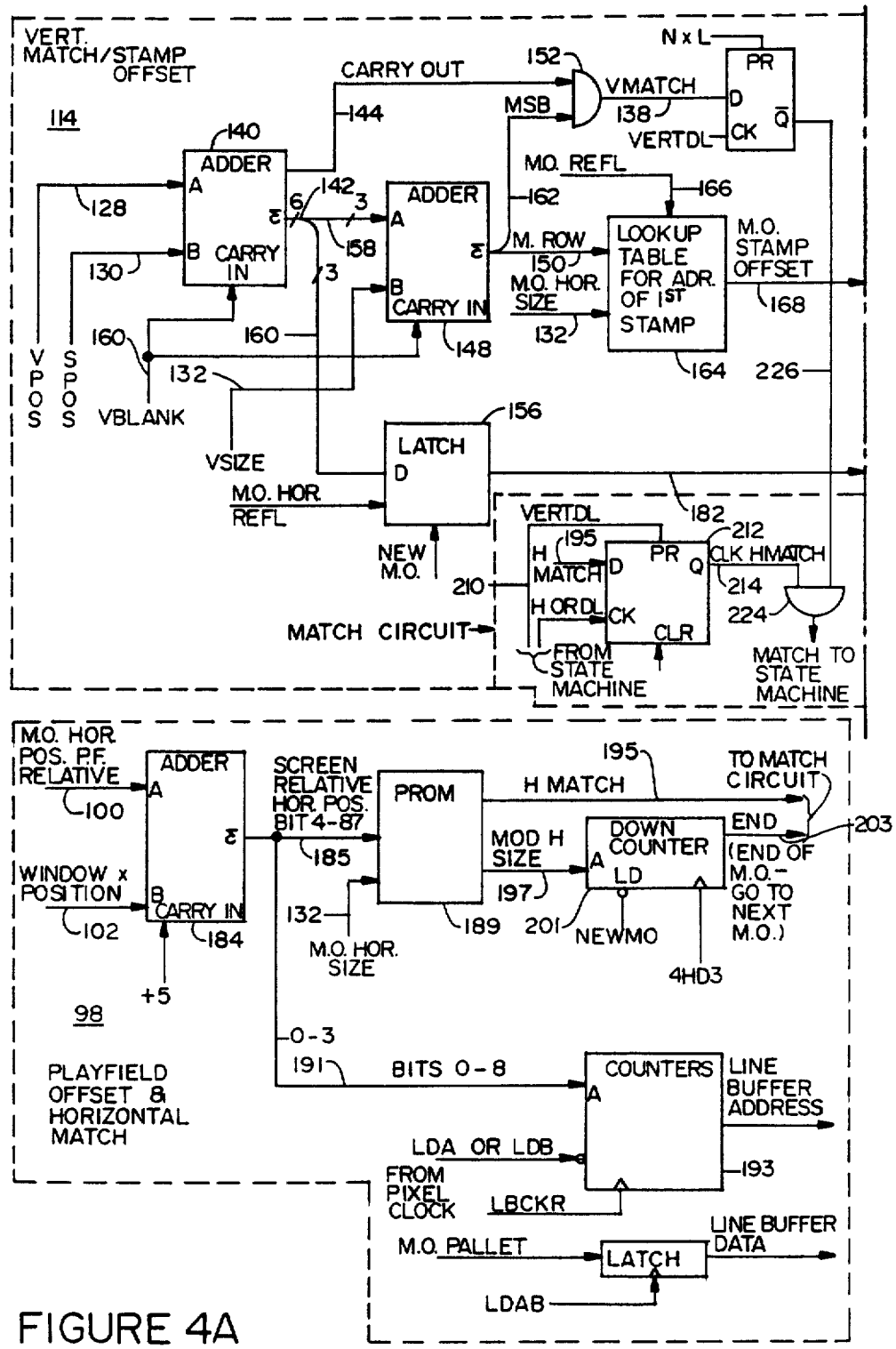
FIGS. 4A and 4B are block diagrams of the vertical and horizontal match circuits and the stamp offset calculation circuits.
Figure 4B:
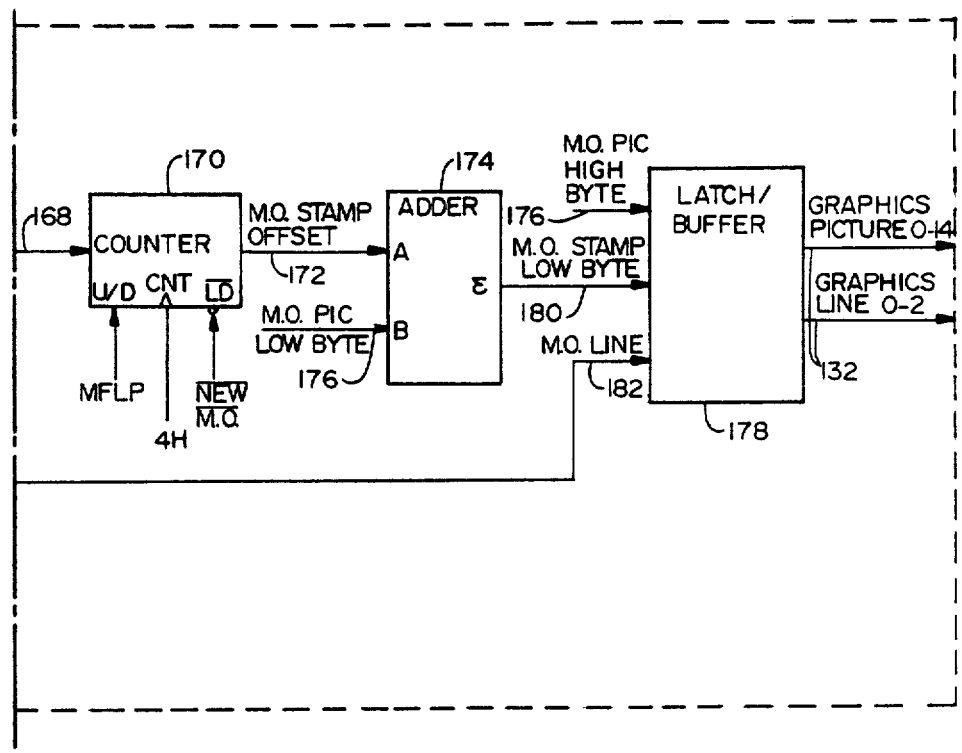

Referring to FIG. 4 (comprised of FIGS. 4A and 4B), the details of the vertical match and stamp offset calculation circuit 114 are given. The first step in determining whether there is a y hit is to compare the y position of the motion object (playfield relative from the top scan line on the playfield) to the y position of the current scan line being processed (also playfield relative as measured from the top scan line on the playfield). One way of doing this is to use two's complement arithmetic and add the two y positions with one or the other expressed in 2's complement form since it is easier to implement an adder than a subtractor.

To implement this approach, an adder 140, an adder 148 and an AND gate 152 are used with the y position of the motion object being expressed in 2's complement form. The adder 140 adds the y position of the motion object expressed in 2's complement form as the number of scan lines up (in the negative y direction) from the reference point 123 in FIG. 2 on the last scan line on the playfield (most positive y) to the y position of the current scan line expressed in terms of the number of scan lines down from the reference point 122 in FIG. 2 in normal format. The y position of the motion object is expressed in 2's complement format in this way because a signal VBLANK on a line 160 coupled to the carry-in input of the adder 140 is a logic 1 thereby adding a 1 to the inverted expression of the motion object y position.

This yields the 2's complement format. The motion object y position in normal format is the offset between the top scan line on the playfield (least positive y) and the lowest scan line on the lowest row (most positive y) of stamps. This y position is converted to the 2's complement format by taking the offset between the lowest scan line and the lowest row of stamps of the motion object and the lowest scan line on the playfield. The computer stores the y position of the top scan line of the current window in the assigned location in the array RAM, and the counter 62 increments it as each scan line is finished. The result is the current scan line position as a playfield relative offset from the reference point 122 on the bus 130.

The equations that must be satisfied to have a y hit are as follows:

$$\text{SPOS} - \text{VPOS is less than or equal or 0,} \quad (1)$$

and $$[\text{SPOS} - \text{VPOS}] + ([\text{VSIZE} + 1] \times 8) \text{ is greater than zero} \quad (2)$$

where

SPOS is the playfield relative current scan line position as an offset from the first scan line at the top of the playfield.

VPOS is the motion object vertical position expressed as an offset from the top scan line on the playfield where the reference point on the motion object stamp array is the lowest line (most positive y coordinate) in the lowest row of stamps in the stamp array and the left most pixel (smallest x coordinate) using the reference system of FIG. 2 with reference point 122 at the origin, and VSIZE is the vertical size of the object expressed in numbers of rows of stamps with 0 representing a vertical size of 1 and 7 representing a vertical size of 8 rows of stamps, where each row is 8 scan lines tall.

The adder 140 is a 9 bit adder and implements equation (1). It adds the 2's complement of VPOS to SPOS and outputs data representing the difference between the two numbers on the 6 bit bus 142 with the top three bits, i.e., bits 6, 7 and 8 represented by the line 144. These most significant three bits are represented by the simple line 144, and are true (logic 1) when both equations (1) and (2) are satisfied if the motion object size VSIZE is 7 (8 rows vertically in the stamp array) or less. The bus 142 is comprised of two sub-buses. The first sub-bus, bus 160, carries the middle three bits (bits 3, 4 and 5) to the input of an adder 148, and the second sub-bus, bus 158 carries bits 0, 1 and 2 to a latch 156. The data on the bus 158 represents the offset in rows of stamps of the bottom of the motion object from the current scan line.

If the current motion object having its y position examined is not 8 stamps by 8 stamps, the vertical size of the object must be examined to determine if equations (1) and (2) are satisfied for the vertical size of the object. Intuitively, the fact that the circuit 114 is trying to determine is whether the bottom of the motion object is lower than the current scan line, and, if so, is the motion object tall enough so that the current scan line passes through it. The adder 148 answers the second half of the inquiry by determining if equation (2) is satisfied for the size of the motion object being examined. The term x 8 is satisfied by the motion object vertical size information in rows of stamps on bus 132 being applied to the B input of the adder and the carry-in input of the adder being tied to logic 1 at all times when vertical match determinations are being made. This adds 1 to the vertical size information. The multiplication by 8 occurs by virtue of the addition of the data at the B input to the data at the A input which is multiplied by 8 by virtue of the A input being connected to bits 3, 4 and 5, i.e., shifted upward by $2^3$ or 8. This shift has the effect of a multiplication by 8. That is, the data on the bus 158 is SPOS−VPOS scan lines divided by 8 to equal the row in the motion object (counting from the bottom of the object) in which the current scan line resides if the motion object is 8×8 stamps.

The result of the addition by the adder 148 is the offset from the current scan line to the top of the motion object with the carry-out set. Thus, if the line 162 is a logic 1 and the three bits represented by line 144 are a logic 1, then there is a y hit, and the AND gate 152 causes VMATCH to go true signaling to the state machine that the current scan line passes through the current motion object and that the picture data should be retrieved if there is also an x hit.

As an example of the above calculation consider FIG. 2. If the current scan line is 250 and the motion object whose vertical position is being examined is motion object 146 with a y position of 20, the y position difference on bus 142 will be 230 scan lines, and equation (1) will not be satisfied because the result is positive and no y hit condition will be signaled. Bus 158 will contain digits representing 230 divided by 8. If, however, the motion object whose y position is on bus 128 is motion object 120, the y position on bus 128 will be the 1's complement representation of 294 and the current scan line will be 250. Thus, the y position difference SPOS−VPOS on bus 142 is −44 scan lines and equation (1) would be satisfied and equation (2) would be satisfied if the motion object were an 8×8 stamp object. Since the motion object 120 is not 8×8 stamps, the result from equation (2) is crucial to determination of whether there is an actual y hit. In the example at hand, the result of equation (2) would be $-44 + [6+1]] \times 8 = 12$ and equation (2) would be satisfied indicating a y hit has occurred. Since scan line 250 is the 4th scan line down from the top scan line in stamps 7 through 12 in the motion object, it can be seen that the result of equation (2) is indeed the offset of the current scan line down from the first scan line in the motion object, i.e., scan line 238. Since the result of the addition by the adder 148 is positive, the carry out on line 162 is true and the AND gate 152 causes VMATCH to be true.

The next function performed by the circuit 114 is a calculation of the first stamp in the row in which the current scan line resides. In FIG. 2, the stamp number for the first stamp in the row containing current scan line 250 is stamp number 7. This process is begun by a lookup table stored in ROM 164. The truth table for ROM 164 is given in Appendix C which can be found only in the patented file. The input of this lookup table is the data on bus 150, i.e., the row offset of the current scan line from the top of the motion object, and the horizontal size of the object on the bus 132. The M.O. REFL signal on the line 166 is a 1 bit field which is stored in an unused part of the word used to record the motion object's y position data. It indicates that the motion object should be a mirror image of the original motion object.

The lookup table 164 uses all the above information to access a record stored therein which is the stamp offset from stamp 1 in the first row to the first stamp in the row in which the current scan line resides. The stamp offset data indicates in the case of the motion object 120 that the first stamp in the row in which the scan line 250 resides is stamp number 7 and is output on the bus 168 to the preset input of a counter 170. This counter receives a signal MFLP at its up/down input which determines whether the counter will count up or down each time a stamp's graphic data has all been loaded into the line buffer so as to be able to display mirror image motion objects. The 4H signal is generated by sync generator 28. It occurs once every 8 pixels, i.e., once for each stamp. A NEW M.O. signal coupled to the load input of the counter 170 causes the data on the bus 168 to be loaded into the counter each time a new motion object is processed and a y hit results.

The output of the counter is on the bus 172 and is the current stamp offset as the scan proceeds across the motion object. This data is added by an adder 174 to the low byte of the motion object picture data on the bus 176. This picture data is stored in the latch 60 in FIG. 1 and is accessed only upon a y hit from the data record for the motion object causing the y hit in the array RAM. This data is related to the actual address in the graphics ROM of the pixel pattern for the appropriate stamp of the motion object which caused the y hit when it is added to the motion object stamp offset data on line 172. The resulting data is output on the bus 180 and is concatenated in a latch 178 with the motion object high byte data on the bus 176 at the most significant bit positions and the motion object line data on the bus 182 in the least significant bit positions. The data on the bus 182 is the actual scan line in the stamp currently pointed to by the stamp offset data. The output data from buffer 178 is the actual address in the graphics ROM of the actual pixel dta for the 8 pixels on the current scan line in the current stamp. This address data is coupled to the graphics ROM on the bus 134 to the multiplexer 136 in FIG. 1.

The horizontal position of motion objects which have had y hits must also be analyzed to determine if the object will be visible in the window and to determine where in the line buffer to write the information if the object will be visible. The circuitry that does this analysis is shown in FIG. 4A which is a detailed block diagram for the playfield offset/horizontal match circuit 98 in FIG. 1. The examination for x hits is started by the adder. This device receives the motion object horizontal position, expressed in playfield relative terms on the bus 100. The current x position of the edge of the window expressed in playfield relative 1's complement terms is received on the bus 102 at the B input of adder 184. In the preferred embodiment, the playfield relative position of the edge of the window position is expressed in 1's complement form by virtue of the computer 20 writing the x position of the window into the latch portion of the circuit 104 in standard signed binary, playfield relative form followed by inversion of the latch output. The complement output data from the latch on the bus 102 is then input at the B input of the adder 184 where it is converted to 2's complement form by virtue of the carry-in input of the adder being set to a logic 1 (adding 1 to a 1's complement number converts it to 2's complement). The addition of the data at the A and B inputs of the counter 184 is actually a subtraction between the motion object horizontal position and the current position of the window because of the 2's complement form of the window position.

The addition by the adder 184 results in the screen relative position of the left edge of the motion object on a bus 185 expressed in units representing two stamps wide. The reason for this is that only bits 4 through 8 of the output of the adder 184 are used for the bus 185 while bits 0 through 8 are used for the bus 191. The data on the bus 191 will be the screen relative position of the leftmost pixel on the current scan line of the current motion object expressed relative to the edge of the window. Because only bits 4-8 are on bus 185, the effect is that of a division by 16 pixels or 2 stamps.

This data on bus 185 will be a negative number if the left edge of the motion object is to the left of the left edge of the current window left edge. The data on the bus 185 is input as part of the address for a PROM 189. The other portion of the address of the PROM 189 is the motion object horizontal size on the bus from latch 38 in FIG. 1. The PROM 189 contains data that converts the playfield relative position of the left edge of the motion object and the motion object's horizontal size expressed in stamps extending to the right into the HMATCH signal and a MOD H SIZE signal. The truth table for the PROM 189 is given in Appendix D which can be found only in the patented file. The PROM 189 data words are such that if the horizontal size is such that any portion of the motion object is in the window, the HMATCH signal on a line 195 will be set to logic 1. If the left edge of the motion object is to the left of the current window left edge, the signal on the line 197 will be the entire horizontal extent of the motion object expressed in numbers of stamps. If, however, the motion object left edge is in the window, but the right edge of the motion object is to the right of the right edge of the window, the data on the bus 197 will be the number of stamps completely or partially visible in the window.

A down counter 201 counts down from the stamp number represented by the data on the bus 197. The count input is coupled to a signal 4HD3 from sync generator 28 which decrements the count every 8 pixel times. The counter is loaded with the data on the bus 197 each time a signal NEWMO goes high. This happens each time the state machine is in the foreground processing state, and loading of the graphic data from an object having x and y hits begins. As long as the counter output is not zero, the down counter outputs the END signal on the line 203 as a logic 0, and the state machine enters the background, lookahead processing state. When the count reaches 0, END becomes a logic 1, and the state machine re-enters the foreground cycle in time slot 3.

Figure 5:
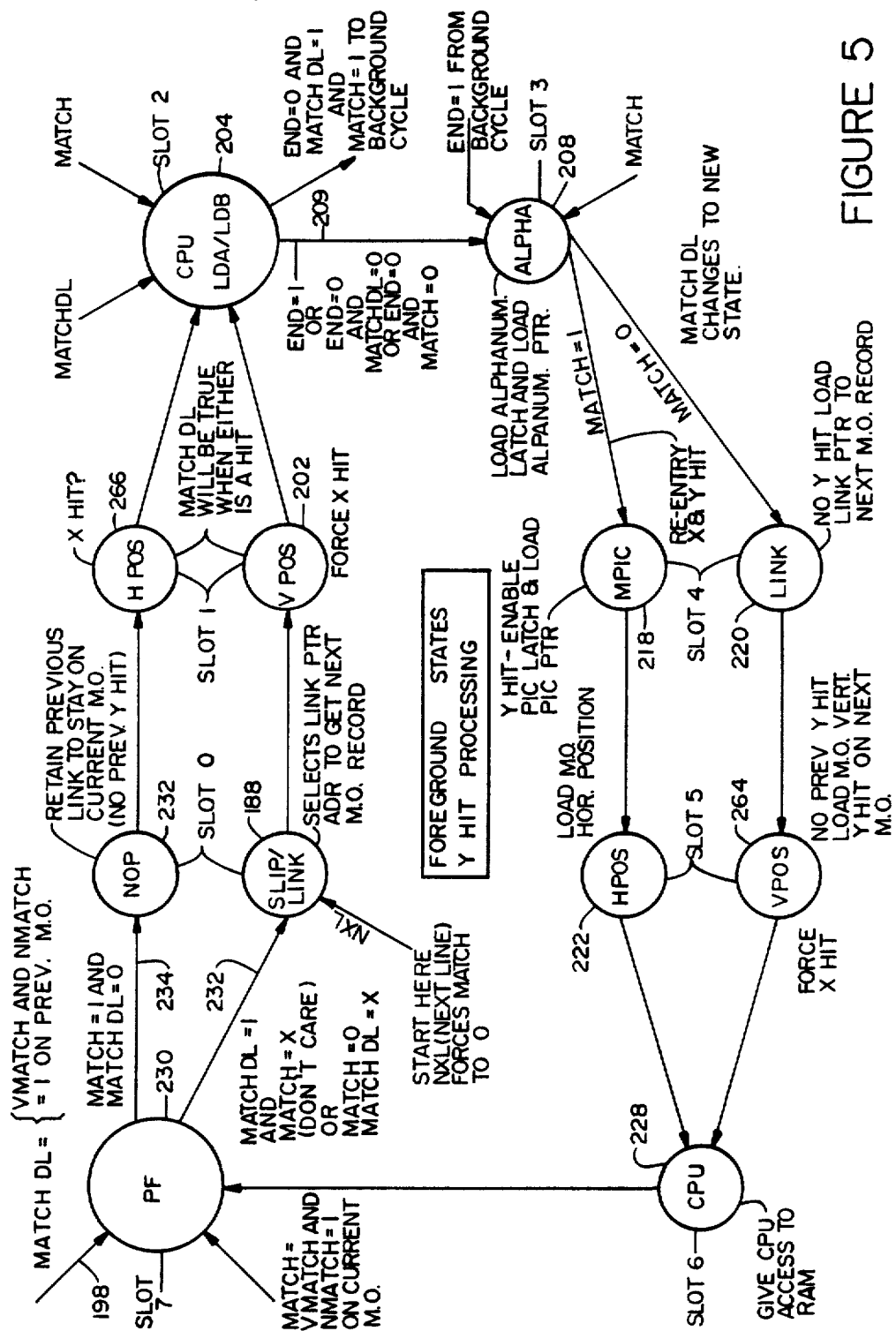
FIG. 5 is a state diagram of the foreground cycle.
Figure 6:
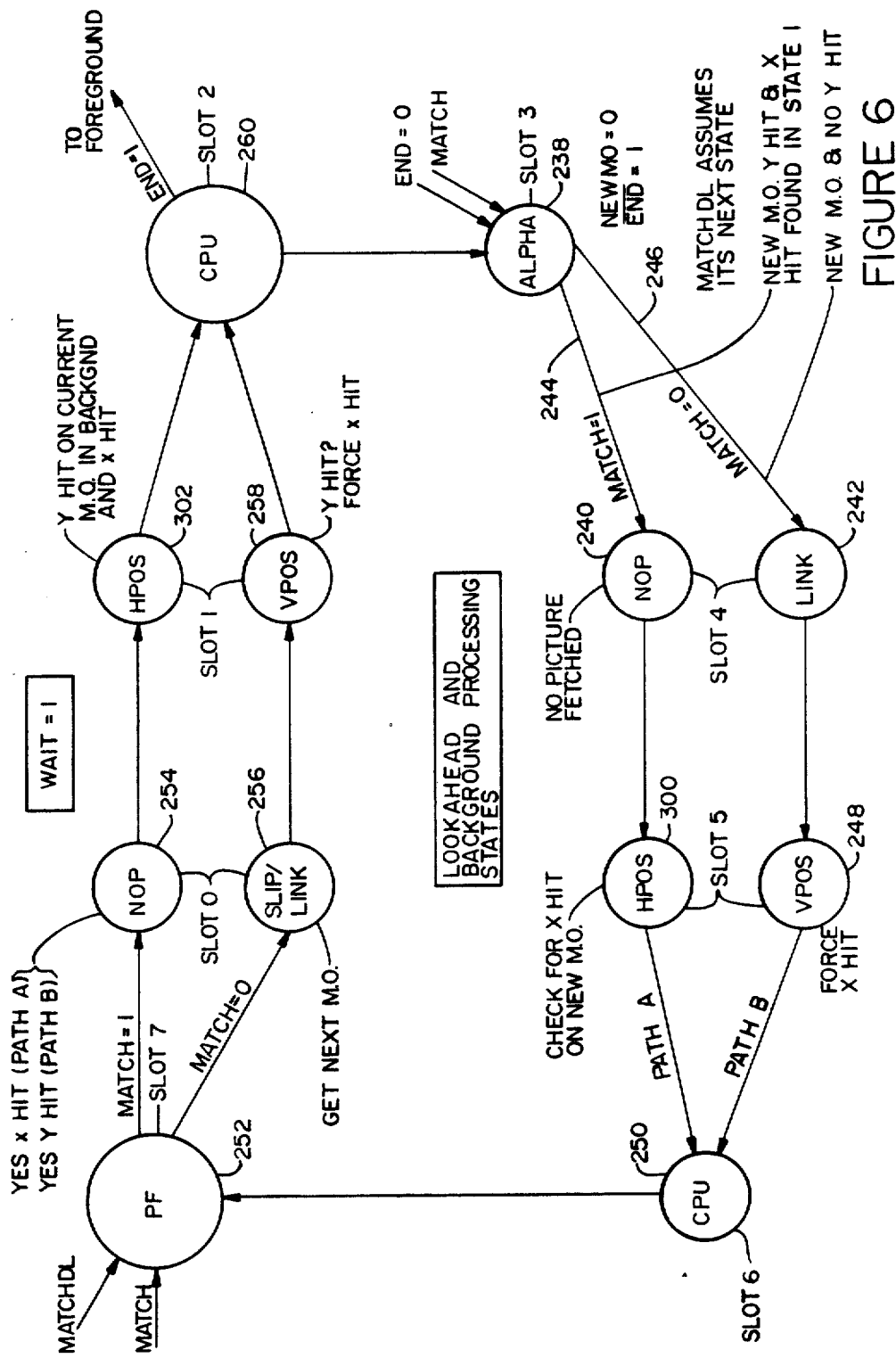
FIG. 6 is a state diagram of the background cycle.

Referring to FIG. 5 there is shown a state diagram for the foreground states of the synchronous state machine 30 in FIG. 1. FIG. 6 shows the background states of the state machine 30 which are used in the lookahead mode. The state machine 30 controls the operation of the system of FIGS. 1A and 1B by cycling through the states shown in FIGS. 5 and 6 during 7 basic time slots and generating the necessary control signals to cause the multiplexer to cycle through all its states to connect each of the buses shown in FIGS. 1A and 1B carrying address data to the address ports of the array RAM during an assigned time slot. The state machine also generates the proper control signals to cause the proper one of the latches coupled to the output of the array RAM to load the data placed on the data bus 56 by the array RAM in response to the address data supplied at its address port. The names inside each state circle indicate which address is selected during that time slot and which latch is loaded with the data that is output from the array RAM in response to the address selected during the time slot.

The background processing cycle is used when a motion object that is to be displayed (that is, a y hit and an x hit have been found) is more than one stamp wide. In all other cases, the foreground processing cycle is used. The state machine receives three clock signals on the bus from the sync generator 28. The sync generator 28 is in turn driven by pixel clock signals on a bus 192 from a pixel clock 46. The pixel clock sets the lowest common denominator of the timing of the system by marking off pixel times during which each pixel is painted by the electron beam as it scans across the raster lines. The sync generator 28 counts the pixel times and generates the horizontal and vertical sync signals on the bus 194 for use by the video display scan circuitry in circuit 26. The horizontal sync signal HSYNC (not the actual horizontal sync signal used by the video but related to it) on bus 196 marks the end of each scan line and the beginning of the next scan line. The timing signals on the bus 190 are used by the state machine as the basic marker signals to determine which of the 7 basic time slots in which the state machine currently resides. Some time slots have two or more states. The particular state in the time slot that the state machine enters depends upon the logic states of several status signals. These status signals indicate such things as whether or not there are y or x hits, the state of the y hit or x hit signals on the last motion object processed, and whether the HSYNC signal is or is not true. They also indicate whether the horizontal stamp address calculation circuit in circuit 98 indicates that the last stamp of graphic data in the row of stamps containing the current scan line has been loaded in the line buffer (END), and whether the state machine is currently in the foreground or the background state (NEWMO feedback signal from the output of the state machine).

The state machine 30 is a PROM, and uses the clock signals on bus 190 and the status signals mentioned above as address signals. The data stored at the addresses made up by the concatenation of all the status and timing signals is then output and latched into a buffer (not shown in FIG. 1). Certain bits are assigned as the load signals for the various latches in the system thereby allowing the state machine to control the storage of the various fields of data being accessed from the array RAM. Certain bits of the data stored in the state machine PROM are assigned as the select bits and control the states of the select signals on the bus 52 to the multiplexer 36. Others of the output bits are control signals to other logic in the system.

The foreground cycle is started by entering state 188 in time slot 0 in FIG. 5. If the status signals indicate that the state 188 is entered at the beginning of a new scan line, data from the memory location in the PROM accessed by the address comprised of the timing signals and status signals controls the select signals in such a way that the slip address is selected and supplied to the array RAM. This causes an entry from the slip table in the array RAM 32 to be loaded into the link register 48. This slip is a link to the first motion object on the linked list through which the current scan line may pass. The state machine is forced into the foreground processing state also at this time (by setting NEWMO true), and the current state of the MATCH status signal is set to false.

When the clock signals indicate time slot 1 is current, the state machine enters state 202. Here the state machine selects the link address on line 44, and sets the M.O. CTL signal on line 58 to select the output word in the motion object record containing the vertical position. This causes the data record of the motion object on the linked list pointed to by the link to be accessed, and the vertical position data as this record to be is placed on the bus 56. In state 202, the state machine also generates a signal which presets the horizontal match signal HMATCH to generate an artificial x hit in case an actual y hit is found when y hit processing is completed by the time time slot 3 arrives. The reason for this will be apparent from the discussion below.

The circuitry for artificial setting of HMATCH true is state 202 is shown in FIG. 4A. In state 202, the state machine sets a signal VERTDL ona line 210 true. This presets a flip flop 212 and causes the signal CLK HMATCH on line 214 to be true regardless of the actual state of HMATCH on line 195.

All the timing and status signals define the address for the state machine PROM on each time slot and do not individually affect states as might be assumed by the reader from inspection of FIGS. 5 and 6. The depiction shown in FIGS. 5 and 6 is synbolic only.

In state 204, the process of examining the vertical position data for a y hit is begun. As soon as state 204 has been entered and the proper control signals generated, the vertical position data loaded into the latch 38 is examined by the circuit 114 independently as described above. The process done by circuit 114 occurs during time slot 2, and the result is available as an input to the state machine during time slot 3.

While circuit 114 is checking for a y hit, the state machine selects address line 206 to give the CPU control of the array RAM 32 address lines. The CPU 20 may then read or write the array RAM to update the current window position or change any of the data in any of the arrays in the array RAM.

To understand how the background and foreground cycles relate to each other, first assume that the foreground processing cycle has been entered for the first time on a new line. Since the signal MATCH was forced to 0 by the NXL signal input to the state machine during state 188, and, since MATCH only changes states between time slots 2 and 3 (or between time slots 6 and 7, then the state machine will transition to a state 208 via a path 209 in the foreground cycle upon reaching time slot 3. In this state, the address on line 40 will be selected and the alphanumeric information for the current pixel position will be retrieved from the alphanumeric array in the array RAM 32. This pointer will be latched in the latch 66 and used by the circuitry 70, 94, 84 and 26 to paint the proper alphanumeric information in the window at the current pixel position.

In time slot 4, the state machine transitions to either state 218 or 220 depending upon the state of the MATCH signal. As can be seen from the match circuitry shown in FIG. 4A, the MATCH signal is generally the AND function of the VMATCH and HMATCH signals clocked by the signals VERTDL and HORDL generated by the state machine in the states where vertical and horizontal match information is needed. Thus MATCH is true only when there has been both a y hit and an x hit. Assuming a y hit on the first motion object processed in the first cycle through the foreground states, the state machine will transition to the state 218. In this state, the link address on line 44 will be selected, and the M.O. CTL bits will be set to access the motion objects picture pointer field which data will be latched into the latch 64.

The state machine will then transition to the state 222 in time slot 5 where the link address will again be selected, and M.O. CTL will be set to access the horizontal position field of the motion object record. This data will be latched into the latch 54, and will be examined by the circuit 98 as detailed above. This processing will result in HMATCH being set to the actual x hit status of the current motion object. The HORDL output signal from the state machine, seen on FIG. 4a, will latch this status into the flip flop 212 and the AND gate 224 in FIG. 4A will reevaluate the signals on the lines 214 and 226 and set MATCH to the logic state representing the actual x and y hit situation.

In time slot 6, state 228 will again grant CPU access to the array RAM. Meanwhile the horizontal match examination process for presence of an x hit will be proceeding simultaneously. The sampling of the status of HMATCH and VMATCH with the signals HORDL and VERTDL will occur in time slot 6. State 230 in time slot 7 is the time slot devoted to access of the playfield stamp data. In this state, the state machine selects the address on lines 42 and 64 and causes the access of the proper playfield picture pointer from the playfield picture array in the array RAM 32. This picture pointer is a pointer to the address of the proper playfield stamp in the graphics ROM 64 and is latched into the playfield picture latch 64. This data is coupled to the address port of the graphics ROM 64 through the multiplexer 136 which the state machine or other suitable logic controls to select the address on the bus 140.

From state 230, the state machine transitions to either state 232 or state 188 depending upon the states of the MATCH and the MATCHDL signals. If an x hit was found by the processing started in state 222, MATCH will be 1. In the hypothetical case at hand, MATCHDL will be 1 because VMATCH changed states to a logic 1 six time slots earlier in state 202 and MATCHDL will have had time to pick up this change between time slots 3 and 4. Whenever MATCHDL is a logic 1, path 232 in the foreground cycle is taken regardless of the state of MATCH. Path 232 is also taken when MATCH is 0 indicating no hit regardless of the state of MATCHDL. The path 234 is taken only if MATCH is a 1 indicating a hit on the current motion object and MATCHDL is a 0 indicating MATCH was 0 and no hit on the previous motion object occurred prior to time slots 3 and 4 of the current cycle in foreground.

In the example at hand, both an x hit and a y hit were found on the first motion object processed, and the state machine has entered state 188 in time slot 0. This causes the link to the second motion object to be latched. Transition to state 202 then occurs and the vertical position data of the second motion object is latched. State 204 is then entered in time slot 2 and CPU access occurs.

Assume that the first motion object is more than one stamp wide (each time slot is equal to one pixel time). This means that END will be 0 and MATCH and MATCHDL will still be logic 1 since the transition from time slot 2 to time slot 3 (for MATCH) will not yet have occured. This means that there was a hit on a motion object and the graphics data is still being retrieved and stored in the line buffer. This will cause the state machine to stop processing in the foreground cycle and enter the background cycle since path 209 is taken only for the conditions shown on FIG. 5.

The state machine now enters the lookahead mode while the graphic data from the first motion object is loaded in the line buffer. Referring to FIG. 6, the first state entered in the background mode is state 238 where the pointer to the graphic data for the alphanumeric information to be displayed at the current pixel or electron beam position is accessed and latched. The state machine then transitions to either state 240 or 242 depending upon the state of MATCH. If there was a y hit found in state 202 of the foreground cycle, the path 244 will be taken so that processing for an x hit can proceed. In the example at hand, and assuming that there was no y hit on the 2nd motion object, path 246 is taken to state 242 where the link to the next motion object is accessed and latched.

The state machine then transitions to state 248 where the vertical position data for the 3rd motion object on the list is accessed and latched. An examination for a y hit is then performed during time slot 6. The state 248 forces HMATCH to be true while looking for a y hit so MATCH will be true in time slot 7 if a y hit is found. A transition to state 250 once again gives the CPU access to the array RAM, and then the state machine changes to state 252 where the playfield picture data pointer is accessed and latched for purpose of painting the playfield objects.

Assume for this example that the 3rd motion object is not a y hit. From state 252, transition to either state 254 or 256 occurs depending upon the states of MATCH and MATCHDL. MATCH will be 0, so transition to state 256 occurs. Assuming that the status signal indicating the beginning of a new line is as hand is false, state 256 will latch the link to the next motion object, i.e., the 4th motion object on the list. Transition to the state 258 is then made, and the y position data for the 4th motion object on the list is accessed and latched. Processing for a y hit then proceeds during time slot 2 as described above while the CPU is given access to the array RAM in state 260. If the END signal changed to logic 1 at any time during the background cycle just described, when state 260 is reached, the state machine again enters the foreground cycle.

Re-entry from the background cycle to the foreground cycle is to state 208 where the alphanumeric pointer is accessed. Transition then occurs to either state 218 or 220 depending upon the current state of MATCH as determined from processing in the background state. In the example, no hits were found in the background state, so processing proceeds to state 220 where the link to the 5th motion object on the list is accessed and stored.

The state machine then transitions to state 264 where the vertical position data of the 5th motion object on the linked list is accessed and latched. State 264 also forces HMATCH to be true as was done in state 202 in time slot 1. Processing for a y hit proceeds in state 228 during time slot 6 as described above in the description of circuit 114. Here, the computer 20 is once again given access to the array RAM, and the state machine makes the transition to state 230.

Assume that a y hit for the 5th motion object was found in the process started by state 264. Thus, when state 230 is reached, MATCH will be 1 and MATCHDL will be 0. This will cause the state machine to transition to state 232 where no operation is performed. Transition to a state 266 is then made where the x position of the 5th motion object is accessed and latched. During time slot 2, the presence or absence of an x hit will be determined while the state machine is in state 204 where access by the computer 20 to the array RAM will again be granted. State 208 will be entered because the MATCHDL signal is a logic 0 indicating no hit on the previous motion object, and processing proceeds as previously described with a transition out of state 208 to state 220 for a no hit on the current motion object", condition or to state 218 for a hit on the current motion object.

Assuming for our example that an x hit was found in state 266, transition will be made to state 208 because there was no hit on the previous motion object and MATCHDL will be 0. The alphanumeric information will be accessed in state 208 and transition to state 218 will be made because MATCH is equal to 1. In state 218 the picture pointer will be retrieved, and the process of loading the line buffer with the pixel data will begin. Transition to state 222 will then be made where the horizontal position data will again be examined and a hit will be found again. This is not necessary, and is only an idiosyncrasy of the way in which the state machine must work. Transition through the states 228 and 230 will then occur for CPU RAM access and accessing of playfield object data. Transition out of state 230 will be to state 188 where the link to the next motion object will be retrieved. Transition to state 202 causes the vertical position of the 6th motion object to be retrieved and the examination for a y hit starts.

Assume that the 5th motion object was more than one stamp wide. MATCHDL will be 1 as determined between time slots 3 and 4 for motion object 5, and END will be 0. This will cause transition out of state 204 into the background state 238 while the END signal remains 0. The reason for this is that the graphics ROM and the horizontal and vertical stamp offset circuitry is busy processing and stamps for the 5th motion object and cannot be simultaneously used to begin kit processing for the 6th motion object. To avoid wasting time, the background lookahead cycle is entered to find the next hit. This architecture implements a search pipeline to speed up processing the linked list to find out which objects will be visible in the current window position.

The background cycle state first executed when the background cycle is entered is state 238 where the alphanumeric information for the motion object at the current electron beam position is accessed and the display process is started in the parallel channel for alphanumeric information. Transition is then made to state 240 because of the y hit found in state 202 of the foreground cycle. If there had been no hit in state 202 when the background cycle was entered, the state 242 would be entered to access the vertical position of the 7th motion object for y hit processing. However, there was a y hit for state 202 for the 6th motion object, so state 240 is entered. This is a no operation state since the picture information cannot be accessed for the 6th motion object while the picture information for the 5th motion object is being processed. Thus, transition to state 300 follows. Here the x position of the 6th motion object is retrieved, and x hit processing is started by the circuit 98.

Assuming an x hit occurred, the background cycle must then enter a wait cycle until END goes to logic 1 indicating the graphic data processing circuitry is free. This wait cycle consists of continual cycling through states 300, 250, 252, 254, 302 (where the horizontal position is examined again—unnecessary but an idiosyncrasy of the operation of the system), state 260, state 238, state 240 and finally back to state 300 to begin the cycle again. This process continues until END goes to 1. After this time, the state machine makes a transition out of the background cycle back into the foreground cycle the next time state 260 is reached.

After re-entering the foreground cycle, the state 208 is reached followed by state 218 where the picture pointer for the 7th motion object found in the background cycle is retrieved. Thereafter, processing continues as described above.

Figure 7:
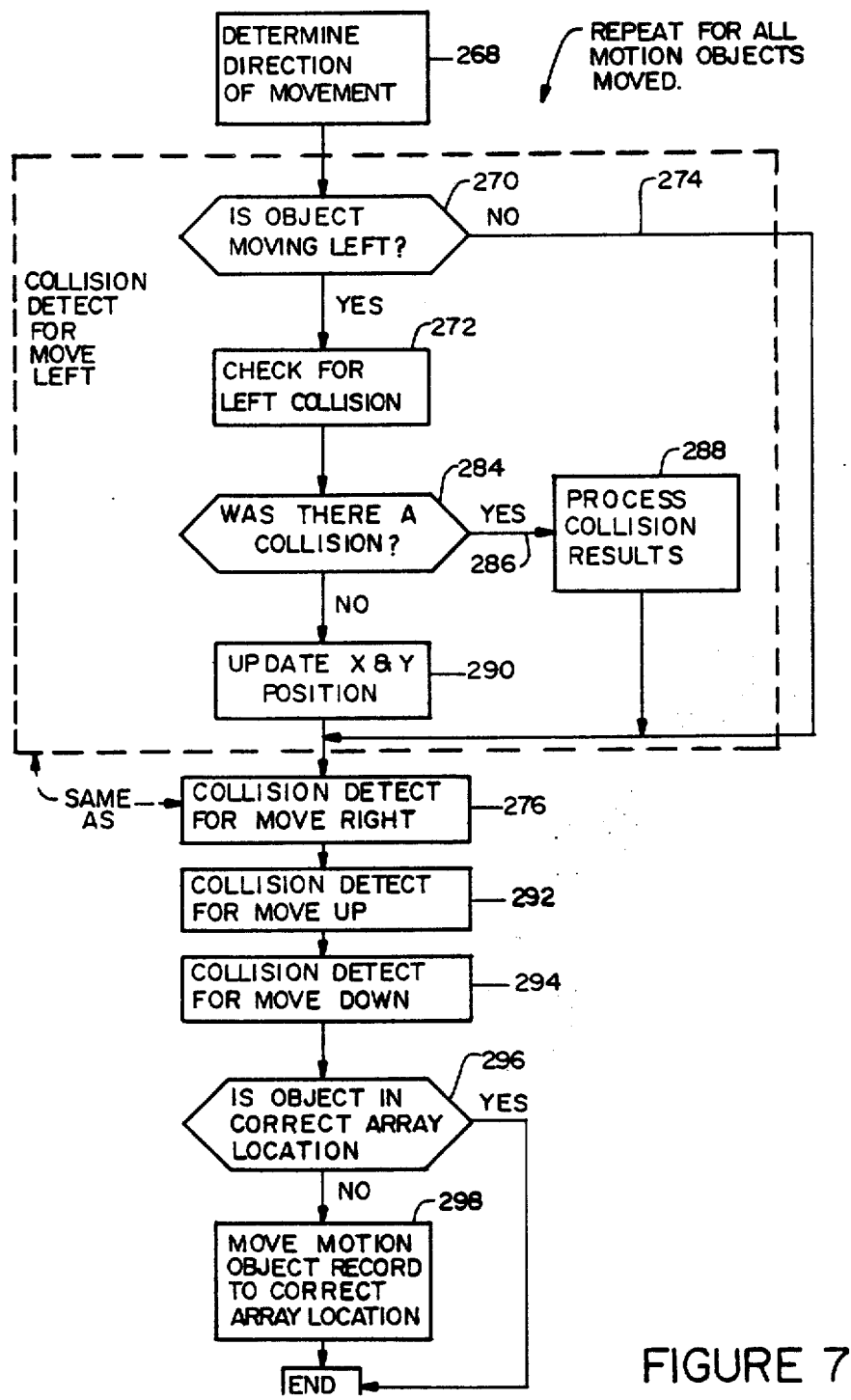
FIG. 7 is a flow diagram of the collision detect algorithm.

Referring to FIG. 7 there is shown a flow diagram of the collision detect process performed by the computer 20 each time a motion object is moved on the playfield. Before the collision detect process can be performed of course, the various arrays in the array RAM must be initialized, i.e., filled. There are many different known ways of doing this, and any of the known methods that will find the collision detect array in the mapped fashion shown in FIG. 3 will suffice. Of course the playfield and alphanumeric arrays must also be filled, and any known method of filling them will suffice as long as the playfield may be painted and the alphanumeric information displayed in the proper places within the time constraints imposed by the time division multiplexed addressing of the array RAM. Generally, it is good practice to organize the arrays so that array entries map to corresponding locations on the screen in a similar fashion to the organization shown in FIG. 3.

One way of filling the arrays is to use a compacted table which describes the types of objects to be placed in the two dimensional array. Then starting at the upper left corner of each array, the array locations are filled from left to right.

After the arrays are filled, the computer periodically reads the player operated controls to get data regarding the desired movements of various motion objects. The computer 20 uses this information to move the various motion objects in the array by accessing the data record for each object and changing the x and y position data and the link data. Before this can be done however, each motion object to be moved must be checked against the position of its neighbors in the collision process of FIG. 7. If the result of the collision detect process is that the move would not result in a collision, then the move is allowed. If the program determines that the object has moved to a new array location, then the entire record for the motion object to be moved is written into the new array location in the collision detect array. For example, if motion object 12 of FIG. 3 is to be moved from the box corresponding to array location 3, 5 to the box corresponding to array location 4,6, then the entire record for motion object 12 will be moved from array location 3,5 to array location 4,6 if the collision detect algorithm indicates this is permissible. In such a case, the links on the linked list will be changed so the link from motion object 11 points to motion object 13 and the link from motion object 14 points to motion object 12 in its new location.

This process is symbolized by the flow of FIG. 7. The first step is to determine the desired movements of the various motion objects. This process of reading the player controls is known and is symbolized by block 268. The other motion objects may be moved using the same collision algorithm. The direction of desired movement is game dependent and is not relevant to the invention. Next, a series of collision detect processes are performed depending upon the direction of movement of the object. The purpose of these collision detect processed is to compare the current position of the motion object with the positions of only, and at most, the nearest neighbors in the collision array in the direction of movement. If the direction of movement is along one of the principal two dimensional axes, then only the three closest neighbors perpendicular to the axes in the nearest straight line of neighbor locations perpendicular to the direction of movement are checked. For example, in FIG. 3, if motion object 12 is to be moved left along the negative x axis considering its present position in box 3,5 as the origin, the collision detect algorithm would check only the the contents of boxes 2,4 and 3,4 and 4,4 for a collision. However, if motion object 12 is to be moved to array location 2,4, the contents of array locations (4,4), (3,4), (2,4), (2,5), and (2,6) will be checked for a collision.

In FIG. 7, this process is started by block 270 which is a test to determine if the motion object is moving left. If it is, then the process of block 272 is performed to check for a left collision. If the result of the test of block 270 is no, then path 274 is taken to the next direction collision test. In FIG. 7, the next direction test is for a move right symbolized by block 276 but it could be any of the other directions since the sequence in which the directions are checked is not important.

The process of checking for a left collision is detailed in FIG. 8. A small segment of the collision detect array is shown at 280 with the motion object to be moved shown at the current position and its nearest neighbors to the left shown as left 1, left 0 and left 2 positions. The x and y positions of the object in the left 0 location are x0 and y0 respectively. A similar notation is used for the left 1 and left 2 object positions. The test for collision of the motion object to be moved with its neighbors is shown at 282. Basically, the x and y positions of the current motion object, designated x and y, respectively, are compared to the x and y positions of its neighbors by a series of subtractions. These tests may be performed in any sequence. As shown, the first test is to take the absolute value of the x position minus the x0 position and compare it to 16. If the absolute value is less than 16, then there is a collision. If the condition is not met, the next test is performed where the absolute value of x−x1 is compared to 16. If the condition is not met, then the next test is performed to determine the absolute value of (x−x2). If any of the x comparison tests indictes a collision, then the y coordinate check indicates a collision, then all further tests are abandoned since only one collision is enough to trigger collision processing.

Block 284 in FIG. 7 symbolizes the testing process detailed above. Path 286 to block 288 symbolizes collision processing if any of the tests for collision indicates there was same. The collision processing is game dependent. The process may include a determination of what collided with what and the result of the collision depends upon the rules of the game. What those rules are is irrelevant to the invention.

If no collision is indicated, block 290 is performed to change the x and y position of the current motion object.

After the block 290 process is performed or after the process of block 288 is performed or if path 274 is taken, the process of block 276 is performed to perform the same type of test as was done for a move left for a move right. The tests of blocks 292 and 294 are performed if the movement involves up or down movement components. Basically, if a movement is not along the x or the y axis, it will have components along two of the 4 basic directions embodied by these axes. For example, if up is called north and left is called west, then a move northwest will have movement components both west and north. In such an example, the up and left tests will be performed and all the others will be skipped.

After all the appropriate tests have been performed, the test of block 296 is performed. Here, the new position of the object moved is tested to determine if it is still in the correct array location corresponding to the box on the screen mapping to that array location. If the answer is no, then the process of block 298 is performed to move the data record of the object moved to the correct array location and to rearrange the linked list.

Although the inventon has been described in terms of the preferred embodiment disclosed herein, those skilled in the art will appreciate other ways of doing the functions disclosed herein. All apparatus and methods that achieve substantially the same result using similar means operating in similar manner are intended to be included within the scope of the claims appended hereto.

What is claimed is:

1. An apparatus for retrieving the pixel data needed for displaying an object positioned on a playfield, a portion of which is displayed on a video display including driver circuitry for sweeping an electron beam horizontally across a cathode ray tube so as to display a plurality of sequentially scanned raster scan lines, each raster scan line defined by a plurality of pixels of video data and each raster scan line having a vertical position defined in terms of a playfield relative offset from a reference raster scan line on said playfield, comprising:

means for storing pixel data defining the appearance of said object, said pixel data for said object being organized as an array of a plurality of stamps arranged as an array having one or more rows and one or more columns of stamps, where each stamp is comprised of a plurality of object scan lines of graphic data with each object scan line having a vertical position defined in terms of a playfield relative offset from a reference raster scan line on said playfield and comprised of a plurality of pixels of graphic data which, when converted to pixels of video data on corresponding raster scan lines defines the appearance of said object on said video display;

means for determining the current raster scan line being displayed and for determining which row of stamps, if any, of said array of stamps intersects or contains the playfield relative vertical position of said current raster scan line and which object scan line of said intersecting row of stamps coincides with the current raster scan line and for determining which stamp in said intersecting row of stamps contains the current horizontal position of said electron beam, and for sequentially retrieving the pixels of graphic data from said stamp for conversion to pixels of video data on the corresponding raster scan line;

wherein said object has a vertical and horizontal size and where said object has both a vertical and horizontal playfield relative position expressed as vertical and horizontal offsets between a reference point on said object and a reference point on said playfield, wherein said means for determining receives data regarding the vertical playfield relative position of the object, the horizontal and vertical size of the object, data regarding said playfield relative vertical position of the current raster scan line being processed and an address indicating where the pixel data of a predetermined stamp in said array of stamps which define the appearance of said object resides in said means for storing and wherein said electron beam has a continuously changing playfield relative horizontal position expressed as a horizontal offset from a reference point on said playfield and wherein said means for determining further comprises means for receiving data regarding the current playfield relative horizontal position of the electron beam painting the current raster scan line, and for calculating from this data whether the current raster scan line passes through the object and the offset in scan lines from the first object scan line in the first row of said array to the current raster scan line and the offset in stamps to the stamp in the row of stamps through which the current raster scan line passes which contains the current playfield relative horizontal position of said electron beam.

2. An apparatus for calculating the correct address of pixels of graphic data to be used for display on a video display including driver circuitry for driving a cursor across a screen in such a manner as to display a plurality of raster scan lines defining a raster, said raster including an object positioned on a playfield where said object is defined by a two-dimensional array of stamps of pixel graphic data where each stamp is comprised of a plurality of object scan lines, each object scan line being comprised of a plurality of pixels of graphic data defining the appearance of the object where said object has a size both horizontally and vertically and a horizontal and vertical playfield relative position expressed as an offset from a reference point on said playfield, comprising:

memory means for storing the pixel graphic data for each object scan line in each stamp in said array in multiple memory locations;

means for storing and supplying data regarding the playfield relative position and size of the object to be displayed and the playfield relative vertical position of said current raster scan line and a picture pointer to the pixel graphic data for a predetermined stamp in said array and for supplying data regarding the current playfield relative horizontal position of said cursor on the current raster scan line; and calculation means coupled to receive data from said means for storing supplying and for determining from said data whether the current raster scan line passes through any row of the stamps of the array of pixel graphic data defining the appearance on said display of said object and, if so, which row and object scan line of that row corresponds to the current raster scan line, and for calculating the address in said memory means of the pixel graphic data in the stamp in the row of said array through which said current raster scan line passes at the column in said array corresponding to the current playfield relative horizontal position of said cursor and on the object scan line in said stamp corresponding to the current raster scan line being processed.

3. The apparatus of claim 2 wherein said means for determining whether the current raster scan line passes through said object further comprises means for generating a vertical match signal when it is determined that the current raster scan line passes through the object.

4. The apparatus of claim 3 further comprising means for receiving data regarding the horizontal playfield relative position of the object on a playfield of which only a window portion is displayed, said window having edges the positions of which are expressed in playfield relative terms as offsets from a reference point on said playfield, and for receiving data regarding the current window edge playfield relative position on the current raster scan line being scanned and data regarding said horizontal size of the object and for calculating whether any part of the object lies within the window portion of the playfield and for generating a horizontal match signal if any portion of said object is calculated to be within the window portion of said playfield.

5. The apparatus of claim 4 further comprising means for determining the number of stamps in the two of said array through which said current raster scan line passes that are to be visible in the window portion of the playfield, and for receiving a signal from which it can be determined how many pixels of graphic data in the stamps to be displayed have been retrieved and for generating an end signal which indicates by its logic state whether the pixel data on the current object scan line in the stamps to be displayed has all been retrieved.

6. The apparatus of claim 5 wherein said means for storing and supplying data further comprises second memory means for storing a plurality of data records, each said data record including data describing the horizontal and vertical playfield relative positions and the size of an associated object on said playfield and data indicating the address in said memory means of the first stamp in the array of stamps of pixel graphic data defining the appearance of said associated object, and wherein said means for storing and supplying and said calculation means sequentially examine the data records associated with predetermined ones of the objects on said playfield to determine which of said objects are in a position on said playfield to be at least partially visible in the window portion of said playfield, and further comprising means for receiving said vertical and horizontal match signals for each object so examined, and for generating a match signal when both said horizontal and vertical signals indicate match conditions exist, where a match condition id defined as at least part of said object being within the window portion of said playfield, and for generating a last object match signal indicating the status of said match signal for the last object and its associated data record which was examined, and wherein said means for storing and supplying includes a state machine coupled to a plurality of input signals including said match and last object match signals and said end signal and timing signals synchronized to the raster scanning on said display and having a plurality of internal states, each state associated with a unique status of said input signals and having a unique set of output control signals associated with each internal state, said states grouped into a foreground cycle and a background cycle, said state machine for using said input signals to control transitions between various states in a foreground cycle and a background cycle where the states in said foreground cycle generate output control signals which control the access of data from said second memory means for use by said calculating means including said data pointing to the address of said pixel graphic data and where the states in said background cycle control the access of data from said second memory means by said means for storing and supplying for use by said calculation means not including said picture pointer and where said match signal and said last object match signal and said end signal control transitions by said state machine between said background cycle and said foreground cycle.

7. An apparatus for displaying a window portion of a playfield on a video display, said video display displaying sequentially a plurality of sequentially scanned raster scan lines including a current raster scan line defined as the raster scan line being scanned at any particular time, each raster scan line comprised of a plurality of pixels of video data, some of said pixels defining the appearance of an object to be displayed positioned in said window portion of said playfield, said object comprised of an array of one or more stamps where said array is two-dimensional and has one or more rows and/or columns if more than one stamp is present, where each stamp has a number and is comprised of multiple object scan lines each of which has a number where each object scan line corresponds to a raster scan line and where said object has a playfield relative position expressed in playfield relative terms as horizontal and vertical offsets from a reference point on said playfield and wherein said object has a horizontal and vertical size, comprising:

a memory for storing the pixel data for each stamp in the array of stamps which describe the pixel pattern of the object;

first means for supplying position data regarding the vertical playfield relative position on said playfield of said object to be displayed, and for supplying data regarding the horizontal and vertical size of said object, and for supplying data regarding the playfield relative position of the current raster scan line being scanned;

second means coupled to said first means for calculating the row and stamp number of the stamp in said array through which the current raster scan line passes and the object scan line number in the stamp so calculated which corresponds to the current raster scan line;

third means for supplying pointer data to the actual address in said memory of said array of stamps defining the appearance of the object;

fourth means coupled to said third means and to said second means for calculating from said pointer data and from the stamp number and object scan line number in the correct stamp corresponding to the current scan line, the address in said memory of the proper pixel data to display on the current raster scan line; and raster scanning video means for receiving the pixel data and for converting said pixel data to the proper video signals for displaying the image defined by said pixel data on said video display.

8. An apparatus for evaluating whether an object positioned on a playfield having a position expressed in playfield relative terms as horizontal and vertical relative offsets from a reference point on said playfield is to be displayed on a current raster scan line of a raster scanned video display scanned by a cursor where each raster scan line has a playfield relative vertical position and where the appearance of said object on said display is defined by an array of stamps of graphic data where said array is comprised of one or more rows and columns of stamps and where each stamp of graphic data has a stamp number and is subdivided into a plurality of object scan lines of graphic data where each object scan line is comprised of a plurality of pixels, and for calculating the correct address for the graphic data describing said object if said object is to be displayed, said object having a horizontal and vertical size, comprising:

first means having a first port for receiving data describing the vertical playfield relative position on the playfield of said object and having a second port for receiving data describing the playfield relative position of the current raster scan line for determining whether the raster scan line would pass through the object if the object had a predetermined vertical size and for outputting data on a first bus which describes the row in the array of stamps counting from the bottom through which the current raster scan line would pass if the object had the predetermined vertical size and for outputting data on a second bus describing the particular object scan line in the row of stamps identified by the data on said first bus which corresponds to the current raster scan line and for generating a first control signal if the vertical playfield relative position of the object being evaluated is lower than the current raster scan line on the playfield where said raster scanned video display sequentially scans raster lines from top to bottom;

second means having a first port coupled to said first bus and having a second port for receiving data describing the vertical size of an object being evaluated for determining if said object should be displayed on the current raster scan line based upon the actual size of said object and for generating data on a third bus indicating the number of object scan lines down from the top object scan line in the array of stamps for the object being evaluated which corresponds to the current raster scan line and for generating a second control signal which is true if the current raster scan line passes through the object;

third means coupled to receive said first and second control signals for generating a match signal when said first and second control signals are in predetermined states;

fourth means coupled to said third bus and having a port for receiving data describing the horizontal size of the object being evaluated for delivering data on a fourth bus describing the stamp number of the first stamp in the array row through which the current raster scan line passes;

fifth means coupled to said fourth bus and having an input for receiving a signal from which the number of pixels that have been scanned in said current raster scan line may be determined for generating data on a fifth bus indicating an offset expressed as the number of stamps from the first stamp in the first row of said array to a current stamp, and for determining from said offset a current stamp number, said current stamp number being the stamp number of the stamp in the row of said array through which the current raster scan line passes and which corresponds to the current horizontal position of said cursor;

memory means for storing the data defining said pixels in said array of stamps describing the appearance of one or more objects; and sixth means coupled to said fifth bus and having a port for receiving said offset and other data from which can be derived the address in said memory means of the pixel data for said current stamp in the array of stamps describing said object and having a port coupled to said second bus for receiving said data generated by said first means identifying said particular object scan line in said current stamp which corresponds to said current raster scan line for generating the address in said memory means of the appropriate pixel data for the object scan line corresponding to the current raster scan line and said current stamp.

9. A method of calculating the address of pixel graphic data stored in a memory which describes the appearance of an object on a raster scanned video display, said object positioned on a playfield in playfield relative terms, said position being expressed as horizontal and vertical offsets from a reference point on said playfield, where said object is defined in said memory by an array of stamps having at least one row and at least one column of stamps of pixel graphic data where each stamp has a number and is comprised of a plurality of object scan lines each having a plurality of pixels of graphic data wherein said raster scanned video display includes sequentially scanned raster scan lines scanned from the top of said video display to the bottom of each of said raster scan lines having a vertical position expressed in playfield relative terms as an offset from a reference raster scan line on said playfield, and a current raster scan line defined as the raster scan line being scanned at any particular moment comprising the steps of:

(1) determining from the vertical playfield relative positions of the object and the current raster scan line, the row in said array of stamps through which the current raster scan line would pass if the object had a predetermined size and the particular object scan line in said row which would coincide with the current raster scan line;

(2) calculating from the row determined in step 1 and from the vertical size of the object the offset of the current raster scan line from the top object scan line in the object;

(3) looking up a stamp offset defined as the number of stamps from the first stamp in the first row of the array to the stamp through which the current raster scan line first passes using the offset from the top object scan line to the current scan line determined in step 2 and the horizontal size of the object as pointers to the proper address in which the offset data is stored;

(4) determining a current stamp number from the stamp number calculated in step 3 using a signal from which can be derived the number of pixels of graphic data from said array which have been scanned; and (5) generating the address in said memory of the pixel data for the current raster scan line and a current stamp defined as the stamp in said array having said current stamp number using the result of step 4 and a pointer address of the start of pixel data in said memory for said object.

* * * * *

UNITED STATES PATENT AND TRADEMARK OFFICE
CERTIFICATE OF CORRECTION

PATENT NO.    : 4,930,074
DATED         : May 29, 1990
INVENTOR(S)   : Patrick J. McCarthy It is certified that error appears in the above-identified patent and that said Letters Patent is hereby corrected as shown below:

On the title page:
In the Abstract, line 5, "synchrounous" should read --synchronous--.

Column 5, line 22, after "moment" insert --.--.

Column 9, line 2, after "playfield" delete --.--.

Column 10, line 43, "playfiled" should read --playfield--.

Column 14, line 1, "9" should read --17--.

Column 15, equation 1 "equal or 0," should read --equal to 0,--.

Column 15, line 45, "if" should read --$\underline{if}$--.

Column 15, line 50, "158" should read --160--.

Column 16, line 41, "-44+[6+1]]x8=12" should read ---44+[6+1]x8=12--.

Column 17, line 36, "dta" should read --data--.

Column 20, line 6, "as" should read --of--.

Column 20, line 6, delete "is".

Column 20, line 14, "is" should read --in--.

Column 20, line 16, "ona" should read --on a--.

Column 20, line 23, "synbolic" should read --symbolic--

Column 22, line 32, "as" should read --at--.

UNITED STATES PATENT AND TRADEMARK OFFICE
CERTIFICATE OF CORRECTION

PATENT NO.    : 4,930,074
DATED         : May 29, 1990
INVENTOR(S)   : Patrick J. McCarthy It is certified that error appears in the above-identified patent and that said Letters Patent is hereby corrected as shown below:

Column 23, line 7, before "no" insert --"--.

Column 24, line 18, "find" should read --fill--.

Column 28, line 18, Claim 5, "two" should read --row--.

Column 28, line 45, Claim 6, after "vertical" please insert --match--.

Column 28, line 46, Claim 6, "id" should read --is--.

Signed and Sealed this

Sixth Day of October, 1992

Attest:

DOUGLAS B. COMER

*Attesting Officer*    *Acting Commissioner of Patents and Trademarks*